US011985173B2

(12) United States Patent
Sirur et al.

(10) Patent No.: US 11,985,173 B2
(45) Date of Patent: May 14, 2024

(54) METHOD AND ELECTRONIC DEVICE FOR BLUETOOTH AUDIO MULTI-STREAMING

(71) Applicant: SAMSUNG ELECTRONICS CO., LTD., Suwon-si (KR)

(72) Inventors: Shruthi Sirur, Bengaluru (IN); Veerabhadrappa Chilakanti, Bengaluru (IN); Pramod Reddy Serikar, Bengaluru (IN); Gurumani Lakshmi Praneeth Juturu, Bengaluru (IN); Gowtham Anandha Babu, Bengaluru (IN); Nikhil Agrawal, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/982,105

(22) Filed: Nov. 7, 2022

(65) Prior Publication Data

US 2023/0064205 A1 Mar. 2, 2023

Related U.S. Application Data

(63) Continuation of application No. PCT/KR2022/008876, filed on Jun. 22, 2022.

(30) Foreign Application Priority Data

Jun. 23, 2021 (IN) .............................. 202141028248
May 20, 2022 (IN) .............................. 202141028248

(51) Int. Cl.
*H04L 65/1059* (2022.01)
*H04L 65/611* (2022.01)
(Continued)

(52) U.S. Cl.
CPC ........ *H04L 65/1059* (2013.01); *H04L 65/611* (2022.05); *H04L 65/612* (2022.05); *H04L 65/80* (2013.01)

(58) Field of Classification Search
CPC . H04L 65/1059; H04L 65/611; H04L 65/612; H04L 65/80; H04W 4/06;
(Continued)

(56) References Cited

U.S. PATENT DOCUMENTS 8,045,921 B2 * 10/2011 Lee ....................... H04W 84/20
455/39
2008/0090524 A1 * 4/2008 Lee ....................... H04W 84/20
455/41.2
(Continued)

FOREIGN PATENT DOCUMENTS

DK 201970533 A1 2/2021
WO 2021/040457 A1 3/2021

OTHER PUBLICATIONS

Examination Report dated Feb. 24, 2023, issued by India Patent Office for Indian Application No. 2141028248.
(Continued)

*Primary Examiner* — Javier O Guzman
(74) *Attorney, Agent, or Firm* — Sughrue Mion, PLLC

(57) ABSTRACT

A method for Bluetooth audio multi-streaming by a first electronic device includes establishing a Broadcast Isochronous Group (BIG) with second electronic devices, broadcasting a first audio to the second electronic devices over the BIG, detecting an audio event at the first electronic device while broadcasting the first audio to the second electronic devices, determining one or more primary electronic devices of the second electronic devices and one or more secondary electronic devices of the second electronic devices, and continuing to broadcast the first audio over the BIG to the one or more secondary electronic devices and concurrently (Continued)

unicasting a second audio that corresponds to the audio event over a Connected Isochronous Group (CIG) connection to the one or more primary electronic devices.

20 Claims, 30 Drawing Sheets

(51) Int. Cl.
*H04L 65/612* (2022.01)
*H04L 65/80* (2022.01)

(58) Field of Classification Search
CPC ............... H04W 4/80; H04M 1/72442; H04M 2250/02; H04M 1/6066; H04R 1/10; H04R 2420/01; H04R 2420/07; H04R 5/033; H04R 5/04; H04R 3/12; G06F 3/165
See application file for complete search history.

(56) References Cited

U.S. PATENT DOCUMENTS

| | | |
|---|---|---|
| 2008/0207137 A1 | 8/2008 | Maharajh et al. |
| 2009/0143007 A1 | 6/2009 | Terlizzi |
| 2017/0201610 A1 | 7/2017 | Motika et al. |
| 2019/0102143 A1 | 4/2019 | Kumar et al. |
| 2020/0236458 A1* | 7/2020 | Degraye ............... G10K 11/178 |
| 2020/0336520 A1* | 10/2020 | Redding ................. H04L 65/61 |
| 2020/0379713 A1 | 12/2020 | Carrigan et al. |
| 2021/0014081 A1* | 1/2021 | Guo .................. H04L 12/40123 |
| 2021/0105713 A1 | 4/2021 | Young |
| 2021/0385886 A1* | 12/2021 | Lo .......................... H04W 76/10 |
| 2022/0217795 A1* | 7/2022 | Lee ............................ H04S 7/40 |
| 2022/0240018 A1* | 7/2022 | Hsieh ..................... H04R 5/033 |
| 2023/0016757 A1* | 1/2023 | Xu ........................... H04R 3/12 |

OTHER PUBLICATIONS

Communication dated Oct. 12, 2022, issued by the International Searching Authority in counterpart International Application No. PCT/KR2022/008876 (PCT/ISA/210 and PCT/ISA/237).

Schwab, "You can finally listen to music while video chatting," Jun. 23, 2020, https://www.fastcompany.com/90518863/you-can-finally-listen-to-music-whilevideo-chatting, Total 11 pages.

"Can I still receive phone calls while I use AmpMe?" AmpMe, Frequently asked questions, Jun. 2021, https://www.ampme.com/faq, Total 3 pages.

* cited by examiner (RELATED ART)

(RELATED ART)

(RELATED ART)

METHOD AND ELECTRONIC DEVICE FOR BLUETOOTH AUDIO MULTI-STREAMING

CROSS-REFERENCE TO RELATED APPLICATIONS

This application is a continuation application of International Application No. PCT/KR2022/008876, filed on Jun. 22, 2022, which is based on and claims priority under 35 U.S.C. § 119 to Indian Provisional Application No. 202141028248, filed on Jun. 23, 2021, in the Indian Patent Office, and to Indian Complete Application No. 202141028248, filed on May 20, 2022, in the Indian Patent Office, the disclosures of all of which are incorporated by reference herein in their entireties.

BACKGROUND

1. Field

The present disclosure relates to audio management methods and systems and, more specifically, to a method and an electronic device for concurrent routing of Low Energy (LE) broadcast media audio and LE unicast conversational audio.

2. Description of Related Art

In general, Bluetooth (BT) is used for short range wireless communication. Bluetooth Low Energy (LE) audio is a new technology that is being standardized by the Bluetooth Special Interest Group (SIG). A classic BT audio operates on a Bluetooth classic radio while LE audio operates on the Bluetooth low energy radio. The LE audio enhances the performance of Bluetooth audio, adds support for hearing aids, and introduces audio sharing, an innovative new Bluetooth use case that changes the way users experience audio and connect with the world around them. The LE audio enables single stream, multi stream, and broadcast audio. Multi-Stream audio enables the transmission of multiple, independent, synchronized audio streams between an audio source device, such as a smartphone, and one or more audio sink devices.

The LE audio adds broadcast audio, enabling an audio source device to broadcast one or more audio streams to an unlimited number of audio sink devices. The broadcast audio opens significant new opportunities for innovation, including the enablement of a new Bluetooth use case, audio sharing. With personal audio sharing, people are able to share their Bluetooth audio experience with others around them; for example, sharing music from a smartphone with family and friends.

However, currently, there is no method continue music/audio sharing to other users while a call or other voice use case is in progress.

SUMMARY

It is an aspect to provide a method and an electronic device for Bluetooth audio multi-streaming.

It is another aspect to provide a method and an electronic device for concurrent routing of LE broadcast media audio and LE unicast conversational audio.

It is another aspect to provide a co-existence of a separate and independent data path for unicast voice data and broadcast audio data inside the electronic device simultaneously, when call/voice is active during broadcast audio music playback, in an application, a framework, or a BT host or DSP, to a BT Controller.

It is another aspect to provide a co-existence of a Connected Isochronous Group (CIG) and a Broadcast Isochronous Group (BIG) at the electronic device to facilitate concurrent music broadcast and unicast call/voice audio.

It is another aspect to provide a dynamic adjustment of LE audio Codec parameters and Quality of Service (QoS) Configurations of a broadcast media source when a unicast call audio is active, based on a Bluetooth (BT) link environment, so that there is an uninterrupted experience for users listening to the broadcasted music.

It is another aspect to designate a personal LE headset of a phone user or any other LE Audio headset as a primary headset in a Broadcast Isochronous Group (BIG), which personal LE headset or primary headset may be used for CIG data transfer.

According to an aspect of one or more embodiments, there is provided a method comprising establishing, by a first electronic device, a Broadcast Isochronous Group (BIG) with a plurality of second electronic devices; broadcasting, by the first electronic device, a first audio to the plurality of second electronic devices over the BIG; detecting, by the first electronic device, an audio event at the first electronic device while broadcasting the first audio to the plurality of second electronic devices; determining, by the first electronic device, at least one primary electronic device of the plurality of second electronic devices and at least one secondary electronic device of the plurality of second electronic devices; and continuing broadcasting, by the first electronic device, the first audio over the BIG to the at least one secondary electronic device and concurrently unicasting a second audio that corresponds to the audio event over a Connected Isochronous Group (CIG) connection to the at least one primary electronic device.

According to another aspect of one or more embodiments, there is provided a first electronic device comprising a memory, a processor, and a Bluetooth audio multi-streaming controller, that is coupled to the memory and the processor, and that is configured to establish a Broadcast Isochronous Group (BIG) with a plurality of second electronic devices; broadcast a first audio to the plurality of second electronic devices over the BIG; detect an audio event at the first electronic device while broadcasting the first audio to the plurality of second electronic devices; determine at least one primary electronic device of the plurality of second electronic devices and at least one secondary electronic device of the plurality of second electronic devices; and continue broadcasting the first audio over the BIG to the at least one secondary electronic device and concurrently unicast a second audio corresponding to the audio event over a Connected Isochronous Group (CIG) connection to the at least one primary electronic device.

According to yet another aspect of one or more embodiments, there is provided a method comprising broadcasting, by a first electronic device, low energy (LE) audio to a plurality of second electronic devices; detecting, by the first electronic device, an audio event at the first electronic device during the broadcasting; and unicasting, by the first electronic device, audio that corresponds to the audio event to at least one of the plurality of second electronic devices while continuing the broadcasting of the LE audio to a remainder of the plurality of second electronic devices.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
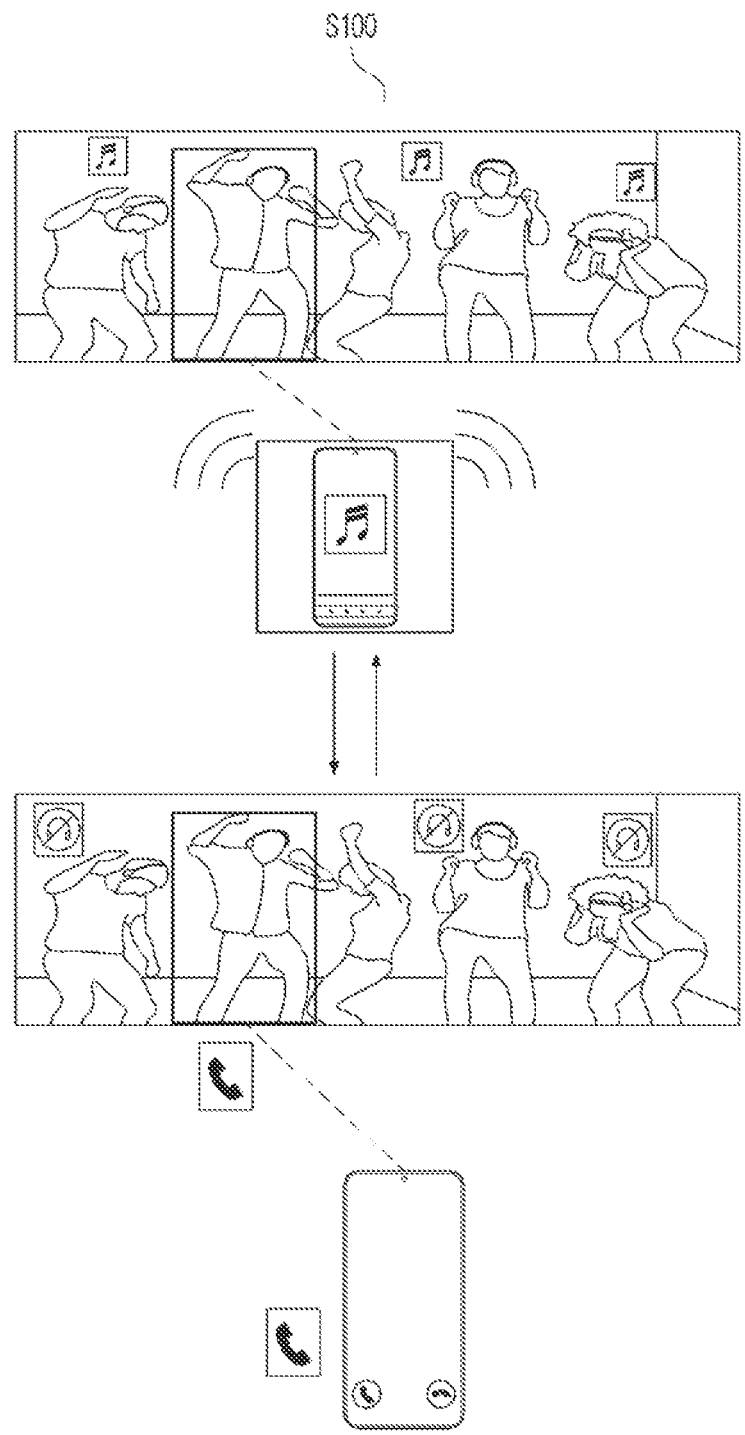
FIG. 1 and FIG. 2 are example scenario in which an electronic device concurrently routs a LE broadcast media audio and a LE unicast conversational audio, according to the related art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may in some cases be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

As described above, in general, Bluetooth (BT) is used for short range wireless communication. Bluetooth Low Energy (LE) audio is a new technology that is being standardized by the Bluetooth Special Interest Group (SIG). A classic BT audio operates on a Bluetooth classic radio while LE audio operates on the Bluetooth low energy radio. The LE audio not only supports development of the same audio products and use cases as classic audio, but LE audio also introduces exciting new features that improve performance as well as enable the creation of new products and use cases.

As described above, LE audio enhances the performance of Bluetooth audio, adds support for hearing aids, and introduces audio sharing, an innovative new Bluetooth use case that changes the way users experience audio and connect with the world around them. The LE audio enables single stream, multi stream, and broadcast audio. Multi-Stream audio enables the transmission of multiple, independent, synchronized audio streams between an audio source device, such as a smartphone, and one or more audio sink devices.

As discussed above, LE audio also adds broadcast audio, enabling an audio source device to broadcast one or more audio streams to an unlimited number of audio sink devices. The broadcast audio opens significant new opportunities for innovation, including the enablement of a new Bluetooth use case, audio sharing. With personal audio sharing, people are able to share their Bluetooth audio experience with others around them; for example, sharing music from a smartphone with family and friends.

Figure 2:
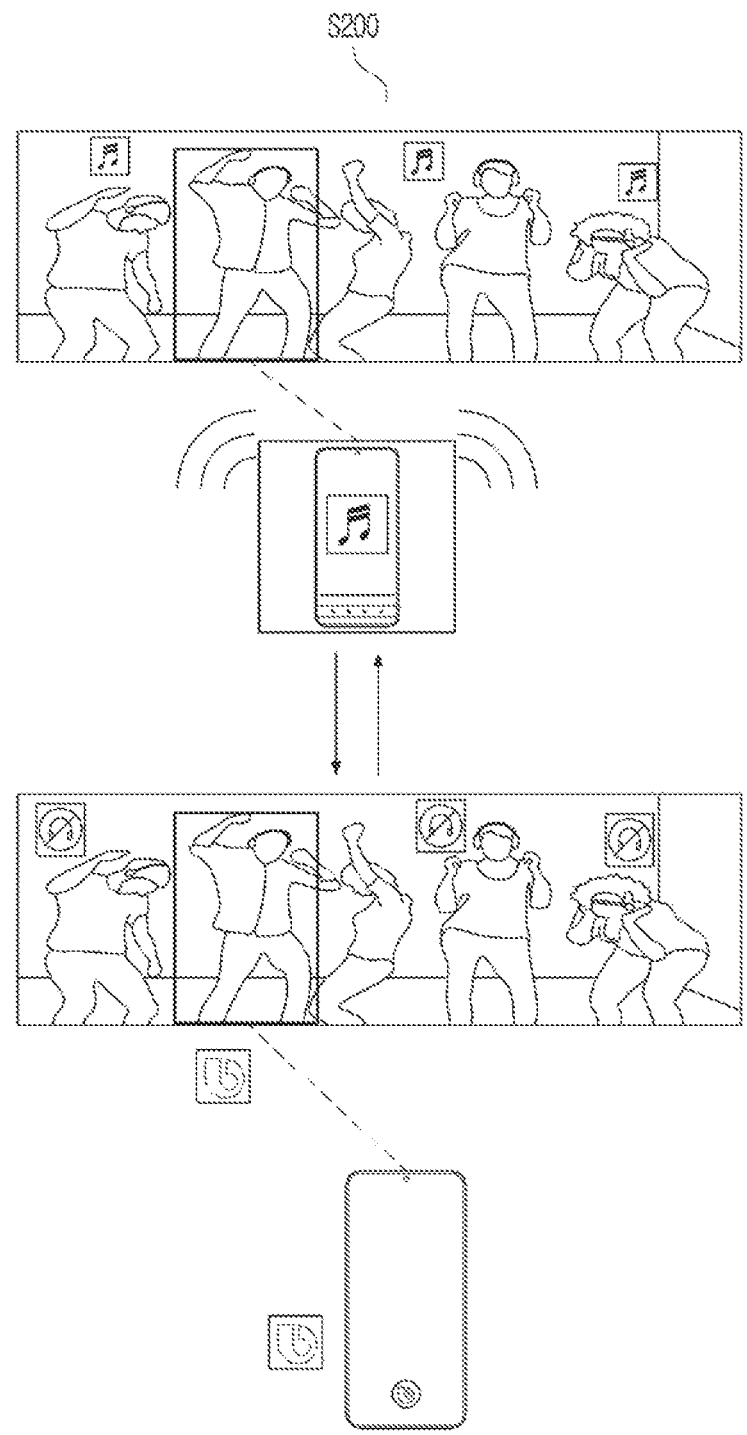

FIG. 1 and FIG. 2 are example scenarios (S100 and S200) in which an electronic device routs a LE broadcast media audio and a LE unicast conversational audio, according to the related art.

As shown in the FIG. 1, a user of an electronic device (e.g., smart phone or the like) is hosting a party and is sharing music from the smart phone with the party members via a LE audio broadcast audio sharing. In FIG. 1, the user may be, for example, the second user from the left among the five party members illustrated in FIG. 1. The user and his friends in the party join the audio sharing group and listen to music in their LE Audio headset devices. When the user receives an incoming regular call on his phone (see phone icon in FIG. 1), the music is paused. If the user's LE audio headset is connected for a call control profile, the call indication ringing is heard on user's LE audio headset. If user accepts the call, the call is active. During the duration of the call, the broadcast audio sharing is paused. For the other listeners who were enjoying the music, suddenly the music is cut off for them. The other party members have to wait until the user terminates the call for the music to resume. The other party members are also not aware of how long they will need to wait before the music can resume.

As shown in the FIG. 2, the user of the electronic device is hosting a party and is sharing music from his phone via the LE audio broadcast audio sharing. Again, the user may be, for example, the second user from the left among the party members illustrated in FIG. 2. The user and his friends in the party join the audio sharing group and listen to music in their LE audio headset devices. When the user uses a voice assistant using LE headset (see voice assistant icon in FIG. 2), the broadcast audio is paused. For the other listeners who were enjoying the music, suddenly the music is cut off for them. The other members have to wait until the user terminates the call for the music to resume. There can be intermittent breaks in broadcast audio whenever the voice assistant is active. The other listeners are also not aware for how long they will need to wait before the music can resume.

In another example, the user of the electronic device is watching a movie on her tablet with her friends. The user and her friends use LE shared audio technology to stream the movie audio to their headsets, while the video is being watched on the tablet. The user and her friends are part of a shared audio group. When the user receives a call, the movie is paused. The movie audio is also paused. The tab screen displays the phone app user interface (UI) for call notification. For the user's friends who were enjoying the movie, suddenly the movie is paused for them. The user's friends have to wait until the user terminates the call for the movie to resume. The other listeners are also not aware of how long they need to wait before the movie can be resumed. The movie watchers are left in a dilemma, whether to wait until the movie resumes or exit the LE shared audio group.

Currently, there is no method to continue music/audio sharing while a call or other voice use case is in progress.

Figure 3:
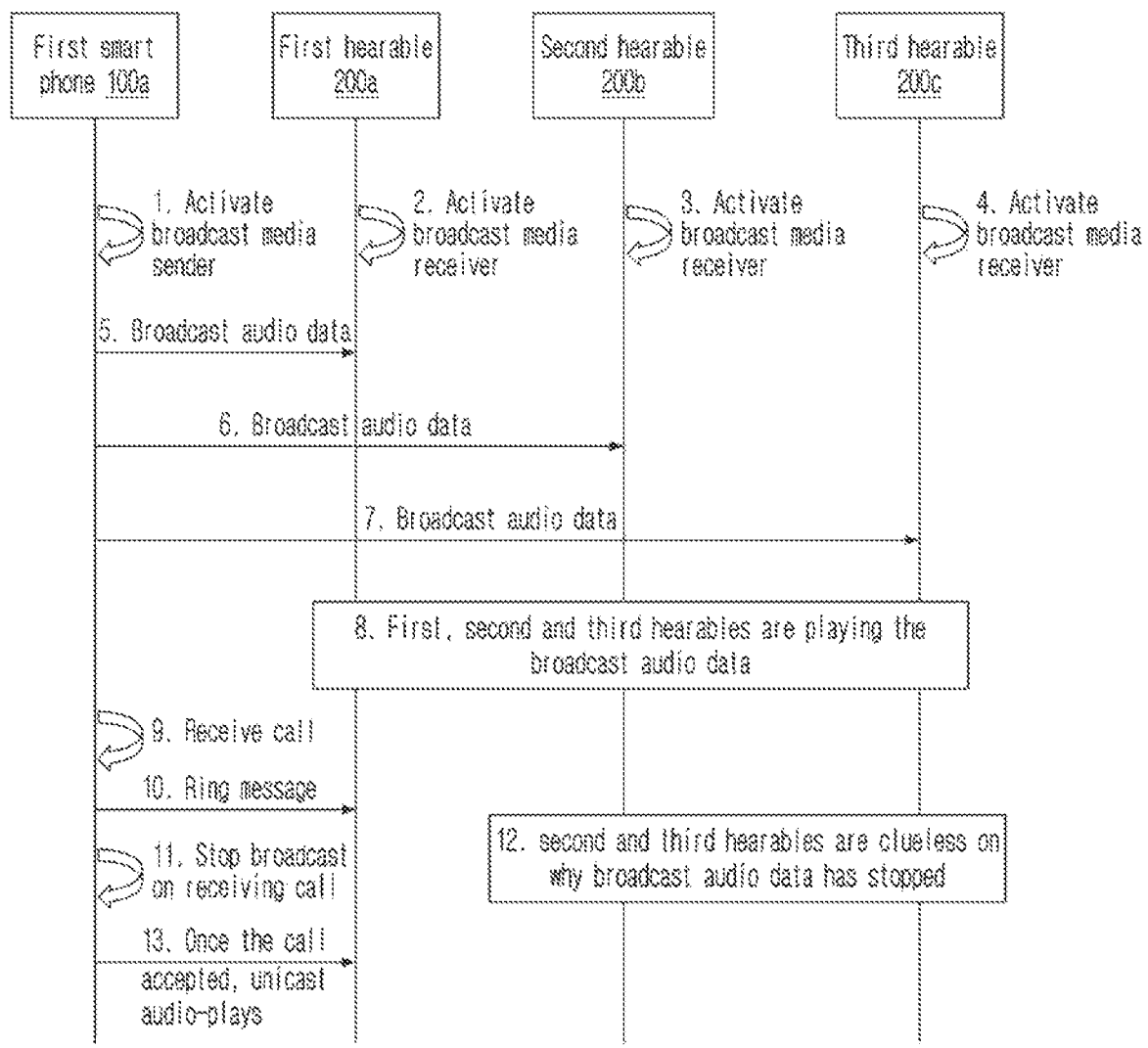
FIG. 3 illustrates a sequence diagram of a method for routing of LE broadcast media audio and the LE unicast conversational audio, according to the related art.

FIG. 3 illustrates a sequence diagram of method for routing of LE broadcast media audio and a LE unicast conversational audio, according to the related art.

At 1, a first smart phone (100*a*) activates a broadcast media sender. At 2, a first hearable (200*a*) activates a broadcast media receiver. At 3, a second hearable (200*b*) activates the broadcast media receiver. At 4, a third hearable (200*c*) activates the broadcast media receiver.

At 5-7, the first smart phone (100*a*) sends the broadcast audio data to the first hearable (200*a*), the second hearable (200*b*), and the third hearable (200*c*). The first smart phone (100*a*) sends the broadcast audio data only once. All three hearables (200*a*-200*c*) receive the broadcast audio data as different instances. At 8, the first, second and third hearables (200*a*-200*c*) are playing the broadcast audio data.

At 9, the first smart phone (100*a*) receives the call. At 10, the first smart phone (100*a*) sends a ring message to the first hearable (200*a*). At 11, the first smart phone (100*a*) stops broadcast while receiving the call. At 12, the second and third hearables (200*b* and 200*c*) have no way to know why the broadcast audio data has stopped. At 13, once the call is accepted, the unicast audio for the call plays at the smart phone (100*a*).

Thus, it is advantageous to address the above mentioned disadvantages or other shortcomings or at least provide a useful alternative.

It is an aspect to provide a method and an electronic device for Bluetooth audio multi-streaming.

It is another aspect to provide a method and an electronic device for concurrent routing of LE broadcast media audio and LE unicast conversational audio.

It is another aspect to provide a co-existence of a separate and independent data path for unicast voice data and broadcast audio data inside the electronic device simultaneously, when call/voice is active during broadcast audio music playback, in application, framework, BT host or DSP, to a BT Controller.

It is another aspect to provide a co-existence of Connected Isochronous Group (CIG) and Broadcast Isochronous Group (BIG) at the electronic device to facilitate concurrent music broadcast and unicast call/voice audio.

It is another aspect to provide dynamic adjustment of LE audio Codec parameters and Quality of Service (QoS) Configurations of broadcast media source when unicast call audio is active, based on Bluetooth (BT) link environment, so that there is an uninterrupted experience for users listening to the broadcasted music.

It is another aspect to designate a personal LE headset of the user or any other LE Audio headset as primary headset in a Broadcast Isochronous Group (BIG), and to use the personal LE headset or the primary headset for CIG data transfer.

The method and electronic device according to various embodiments enable both music and call applications to run simultaneously using a concurrent LE audio routing policy. The Bluetooth stack is modified to control both BIG (Broadcasting Audio from the electronic device) and CIG (Transferring call audio to a Primary Headset from the phone). Both CIG and BIG may be given equal preference. The Bluetooth Controller may be informed to receive audio data packets from both HCI and I2S interfaces. The ISO adaptation layer may receive the audio data packets from both interfaces of BT controller at the same time. Both the BIG and CIG events at a radio frequency (RF) side may be arranged in sequential or interleaved way to support the use case.

Based on the method according to various embodiments, when a user of the electronic device receives a call (e.g., a contact control panel (CCP) Profile) during an ongoing music broadcast, the broadcast music streaming continues to other users and the call is processed for the user of the electronic device that receives the call. Other users tuned to the Broadcast music streaming continue to enjoy music. When the call ends for the user of the electronic device, the user of the electronic device continues to enjoy the music broadcast.

Accordingly, various embodiments provide a method for Bluetooth audio multi-streaming. The method may include establishing, by a first electronic device, a Broadcast Isochronous Group (BIG) with a plurality of second electronic devices. Further, the method may include broadcasting, by the first electronic device, the first audio to the plurality of second electronic devices over the BIG. Further, the method may include detecting, by the first electronic device, an audio event at the first electronic device while broadcasting the first audio on the plurality of second electronic devices. Further, the method may include determining, by the first electronic device, at least one primary second electronic device of the plurality of second electronic devices and at least one secondary second electronic device of the plurality of the electronic devices. Further, the method may include continuing broadcasting, by the first electronic device, the first audio over the BIG to the at least one secondary electronic device and concurrently unicasting a second audio corresponding to the audio event over a Connected Isochronous Group (CIG) connection to the at least one primary electronic device.

In some embodiments, the audio event may be at least one of receiving an incoming call at the first electronic device, initiating an outgoing call by the first electronic device, receiving an incoming notification at the first electronic device, and receiving an alert generated at the first electronic device, initiating a voice recording application at the first electronic device, or initiating a voice assistant application at the first electronic device.

In some embodiments, continuing broadcasting, by the first electronic device, the first audio over the BIG to the at least one secondary electronic device and concurrently unicasting the second audio corresponding to the audio event over the CIG connection to the at least one primary electronic device may include creating, by the first electronic device, a CIG interface between a Bluetooth controller and Digital Signal Processor (DSP) controller, removing, by the first electronic device, the at least one primary electronic device from the BIG, establishing, by the first electronic device, the CIG connection with the at least one primary electronic device, configuring, by the first electronic device, a message comprising CIS packets for the at least one primary electronic device and BIS packets for the at least one secondary electronic device, and broadcasting, by the first electronic device, the BIS packets to the at least one secondary electronic device over the BIG through the BIG interface while concurrently unicasting the CIS packets to the at least one primary electronic device over the CIG through the CIG interface.

In some embodiments, the method may include interleaving and sending, by the first electronic device, the BIS packets and the CIS packets in a single Isochronous (ISO) interval for optimum bandwidth utilization at the first electronic device.

In some embodiments, the method may include detecting, by the first electronic device, that the audio event is on-going at the first electronic device. Further, the method may include managing, by the first electronic device, audio codec parameters and Quality of Service (QoS) configurations of the first audio when the second audio is active based on the on the detection.

In some embodiments, the method may include detecting, by the first electronic device, that the audio event is stopped at the first electronic device. Further, the method may include broadcasting, by the first electronic device, the first audio to the plurality of second electronic devices over the BIG based on the detection.

In some embodiments, the first electronic device may send and receive the first audio and the second audio simultaneously over the BIG interface and the CIG interface using at least one of broadcasting the first audio from a DSP controller to a Bluetooth controller and sharing the second audio between the Bluetooth controller and at least one of a Bluetooth host, a processor and the DSP controller, or broadcasting the first audio from the Bluetooth host to the Bluetooth controller and sharing the second audio between the Bluetooth controller and at least one of the processor and the DSP controller.

In some embodiments, the first electronic device may use a low and medium quality of service QoS configuration for codec parameters for bandwidth optimization at the first electronic device.

Accordingly, various embodiments herein provide a first electronic device for Bluetooth audio multi-streaming. The first electronic device may include a Bluetooth audio multi-streaming controller coupled to a memory and a processor. The Bluetooth audio multi-streaming controller may be configured to establish a Broadcast Isochronous Group (BIG) with a plurality of second electronic devices and broadcast the first audio to the plurality of second electronic devices over the BIG. Further, the Bluetooth audio multi-streaming controller may be configured to detect an audio event at the first electronic device while playing back the first audio on the plurality of second electronic devices and determine at least one primary second electronic device of the plurality of second electronic devices and at least one secondary second electronic device of the plurality of the electronic devices. Further, the Bluetooth audio multi-streaming controller may be configured to continue broadcasting the first audio over the BIG to the at least one secondary electronic device and concurrently unicast a second audio corresponding to the audio event over a Connected Isochronous Group (CIG) connection to the at least one primary electronic device.

As described above, various embodiments provide a method for Bluetooth audio multi-streaming. The method may include establishing, by the first electronic device, a BIG with a plurality of second electronic devices. Further, the method may include broadcasting, by the first electronic device, the first audio to the plurality of second electronic devices over the BIG. Further, the method may include detecting, by the first electronic device, an audio event at the first electronic device while broadcasting the first audio to the plurality of second electronic devices. Further, the method may include determining, by the first electronic device, at least one primary second electronic device of the plurality of second electronic devices and at least one secondary second electronic device of the plurality of the electronic devices. Further, the method may include continuing broadcasting, by the first electronic device, the first audio over the BIG to the at least one secondary electronic device and concurrently unicasting a second audio corresponding to the audio event over a Connected Isochronous Group (CIG) connection to the at least one primary electronic device.

The method according to various embodiments may provide a co-existence of a separate and independent data path for unicast voice data and broadcast audio data inside the electronic device simultaneously, when call/voice is active during broadcast audio music playback, in an application, a framework, a BT host or DSP, to a BT Controller. The method according to various embodiments may be used to provide a co-existence of the CIG and the BIG at the electronic device to facilitate concurrent music broadcast and unicast call/voice audio. The method according to various embodiments may be used to provide a dynamic adjustment of LE audio Codec parameters and QoS Configurations of broadcast media source when unicast call audio is active, based on a BT link environment, so that the method and the electronic device may perform simultaneous music broadcast and also participate in the call scenario so that there is an uninterrupted experience for users listening to the broadcasted music.

The method according to various embodiments may designate a phone user's personal LE headset or any other LE Audio headset as a primary headset in the BIG. The primary headset may be used for CIG data transfer. The method according to various embodiments may enable both music and call applications to run simultaneously using the concurrent LE audio routing policy. The Bluetooth stack may be modified to control both BIG (Broadcasting Audio from the electronic device) and CIG (Transferring call audio to Primary Headset from phone). Both CIG and BIG may be given equal preference. The Bluetooth Controller may receive audio data packets from both HCI and I2S interfaces. The ISO adaptation layer may receive the audio data packets from both interfaces of BT controller at the same time. Both the BIG and CIG events at a RF side may be arranged in a sequential or an interleaved way to support the use case.

Based on the method according to various embodiments, when a user of the electronic device receives call (CCP Profile) during ongoing music broadcast, the broadcast music streaming continues to other users and the call is processed to primary user. Other users tuned to the Broadcast music streaming continue to enjoy music. When the call ends for the primary user, the primary user continues to enjoy the music broadcast.

Based on the method according to various embodiments, in an example, when a user's phone and personal LE headset device are part of same BIG, with the user's phone acting as broadcast media source, the user's personal headset may be designated as primary LE headset. The remaining headset devices in the BIG may be treated as secondary LE headsets by the phone. The identification of the primary LE headset may be done when the user unboxes and sets up his headset, or through a user interface in an application. The user may be able to add/remove/update primary headset details at any time using app user interface. Further, the method may provide simultaneous co-existence of unicast and broadcast LE audio groups on the phone, the unicast for conversational audio and the broadcast for media audio. The phone may set up unicast call audio with a headset that is originally part of a broadcast audio group, while continuing the media audio broadcast to other members in the broadcast group. Simultaneous and independent data paths from audio source to Bluetooth controller may facilitate the coexistence of broadcast media and unicast call audio on the phone.

During broadcast of music by phone, if the phones receive/make call, the audio output in music playback data path is not stopped. The phone, as a Broadcast Assistant to the primary headset, may remove the primary headset from BIG and set up a CIS unicast call audio link, forming the CIG with the primary headset. There thus is a coexistence of CIG and BIG at the phone's end. The phone also may remember that the primary headset has previously been part of its ongoing BIG streaming. When the phone makes/receives a call, the phone may check an Audio Hardware Abstraction Layer (HAL), data encoding session type and a BT Controller interface that are being used to route broadcast music data from music player application to the BT controller. The phone may choose an alternative audio HAL, data encoding session, and BT controller interface to route the call audio data from phone application to BT controller (which then sends call audio data to the primary headset).

Referring now to the drawings and more particularly to FIGS. 4 through 24B, where similar reference characters denote corresponding features consistently throughout the figures, there are shown preferred embodiments.

Figure 4:
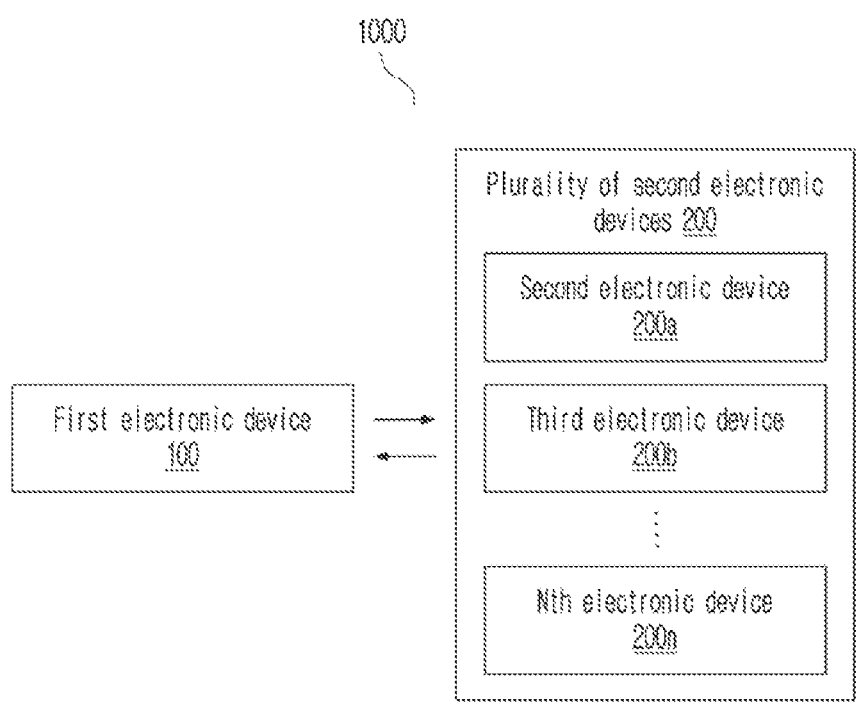
FIG. 4 illustrates an example of a system for Bluetooth audio multi-streaming, according to an embodiment.

FIG. 4 illustrates an example of a system (1000) for Bluetooth audio multi-streaming, according to an embodiment. In an embodiment, the system (1000) includes a first electronic device (100) and a plurality of second electronic devices (200a-200n). The first electronic device (100) may be, for example, but is not limited to a laptop, a desktop computer, a notebook, a relay device, a Device-to-Device (D2D) device, a vehicle to everything (V2X) device, a smartphone, a tablet, an immersive device, an internet of things (IoT) device, or the like. The plurality of second electronic devices (200a-200n) may be, for example, but are not limited to wireless earbuds, True Wireless Stereo (TWS), Bluetooth earphones or the like. In some embodiments, the plurality of second electronic devices (200a-200n) may be, for example, phones, computers or other such devices which are able to be connected to the first electronic device by Bluetooth communication.

The first electronic device (100) establishes a Broadcast Isochronous Group (BIG) with the plurality of second electronic devices (200a-200n) and broadcasts a first audio to the plurality of second electronic devices (200a-200n) over the BIG. Further, the first electronic device (100) detects an audio event at the first electronic device (100) while broadcasting the first audio to the plurality of second electronic devices (200a-200n). The audio event may be, for example, but is not limited to receiving an incoming call at the first electronic device (100), initiating an outgoing call by the first electronic device (100), receiving an incoming notification at the first electronic device (100), receiving an alert generated at the first electronic device (100), initiating a voice recording application at the first electronic device (100), and/or initiating a voice assistant application at the first electronic device (100).

Further, the first electronic device (100) determines at least one primary second electronic device of the plurality of second electronic devices (200a-200n) and at least one secondary second electronic device of the plurality of the electronic devices (200a-200n). Further, the first electronic device (100) creates a Connected Isochronous Group (CIG) interface between a Bluetooth controller (see, e.g., BT controller (120) illustrated in FIG. 8) and a Digital Signal Processor (DSP) controller (see, e.g., DSP controller (118) illustrated in FIG. 8).

Further, the first electronic device (100) removes the at least one primary electronic device from the BIG and establishes the CIG connection with the at least one primary electronic device. Further, the first electronic device (100) configures a message comprising CIS packets for the at least one primary electronic device and BIS packets for the at least one secondary electronic device. Further, the first electronic device (100) broadcasts the BIS packets to the at least one secondary electronic device over the BIG through the BIG interface while concurrently unicasting the CIS packets to the at least one primary electronic device over the CIG through the CIG interface.

Figure 5:
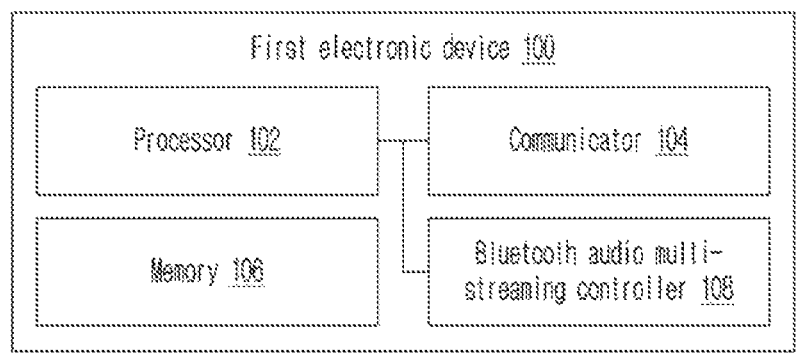
FIG. 5 illustrates an example of various hardware components of an electronic device for the Bluetooth audio multi-streaming, according to an embodiment.

FIG. 5 illustrates an example of various hardware components of the first electronic device (100) for the Bluetooth audio multi-streaming, according to an embodiment. In an embodiment, the first electronic device (100) includes a processor (102), a communicator (104), a memory (106), and a Bluetooth audio multi-streaming controller (108). The processor (102) is coupled with the communicator (104), the memory (106) and the Bluetooth audio multi-streaming controller (108).

The Bluetooth audio multi-streaming controller (108) establishes the BIG with the plurality of second electronic devices (200a-200n). Further, the Bluetooth audio multi-streaming controller (108) broadcasts the first audio to the plurality of second electronic devices (200a-200n) over the BIG. Further, the Bluetooth audio multi-streaming controller (108) detects the audio event at the first electronic device (100) while broadcasting the first audio to the plurality of second electronic devices (200a-200n).

Further, the Bluetooth audio multi-streaming controller (108) determines the at least one primary second electronic device of the plurality of second electronic devices (200a-200n) and at least one secondary second electronic device of the plurality of the electronic devices(200a-200n). Further, the Bluetooth audio multi-streaming controller (108) creates the CIG interface between the Bluetooth controller (120) and the DSP controller (118). Further, the Bluetooth audio multi-streaming controller (108) removes the at least one primary electronic device from the BIG. Further, the Bluetooth audio multi-streaming controller (108) establishes the CIG connection with the at least one primary electronic device.

Further, the Bluetooth audio multi-streaming controller (108) configures the message comprising CIS packets for the at least one primary electronic device and BIS packets for the at least one secondary electronic device. Further, the Bluetooth audio multi-streaming controller (108) broadcasts the BIS packets to the at least one secondary electronic device over the BIG through the BIG interface while concurrently unicasting the CIS packets to the at least one primary electronic device over the CIG through the CIG interface.

In some embodiments, the Bluetooth audio multi-streaming controller (108) may be physically implemented by analog and/or digital circuits such as logic gates, integrated circuits, microprocessors, microcontrollers, memory circuits, passive electronic components, active electronic components, optical components, hardwired circuits and the like, and may in some embodiments be driven by firmware. In some embodiments, the Bluetooth audio multi-streaming controller (108) may be operated, provided, and/or integrated with the BT controller (120).

Further, the processor (102) is configured to execute instructions stored in the memory (106) and to perform various processes. The communicator (104) is configured for communicating internally between internal hardware components and with external devices via one or more networks. The memory (106) also stores instructions to be executed by the processor (102). The memory (104) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (106) may, in some examples, be considered a non-transitory storage medium. The term "non-transitory" may indicate that the storage medium is not embodied in a carrier wave or a propagated signal. However, the term "non-transitory" should not be interpreted that the memory (106) is non-movable. In certain examples, a non-transitory storage medium may store data that can, over time, change (e.g., in Random Access Memory (RAM) or cache).

Although the FIG. 5 shows an example of various hardware components of the first electronic device (100), embodiments are not limited thereto. In other embodiments, the first electronic device (100) may include a fewer or a greater number of components. Further, the labels or names of the components are used only for illustrative purposes and do not limit the scope of the present disclosure. In some embodiments, one or more components may be combined together to perform same or substantially similar function in the first electronic device (100).

Figure 6:
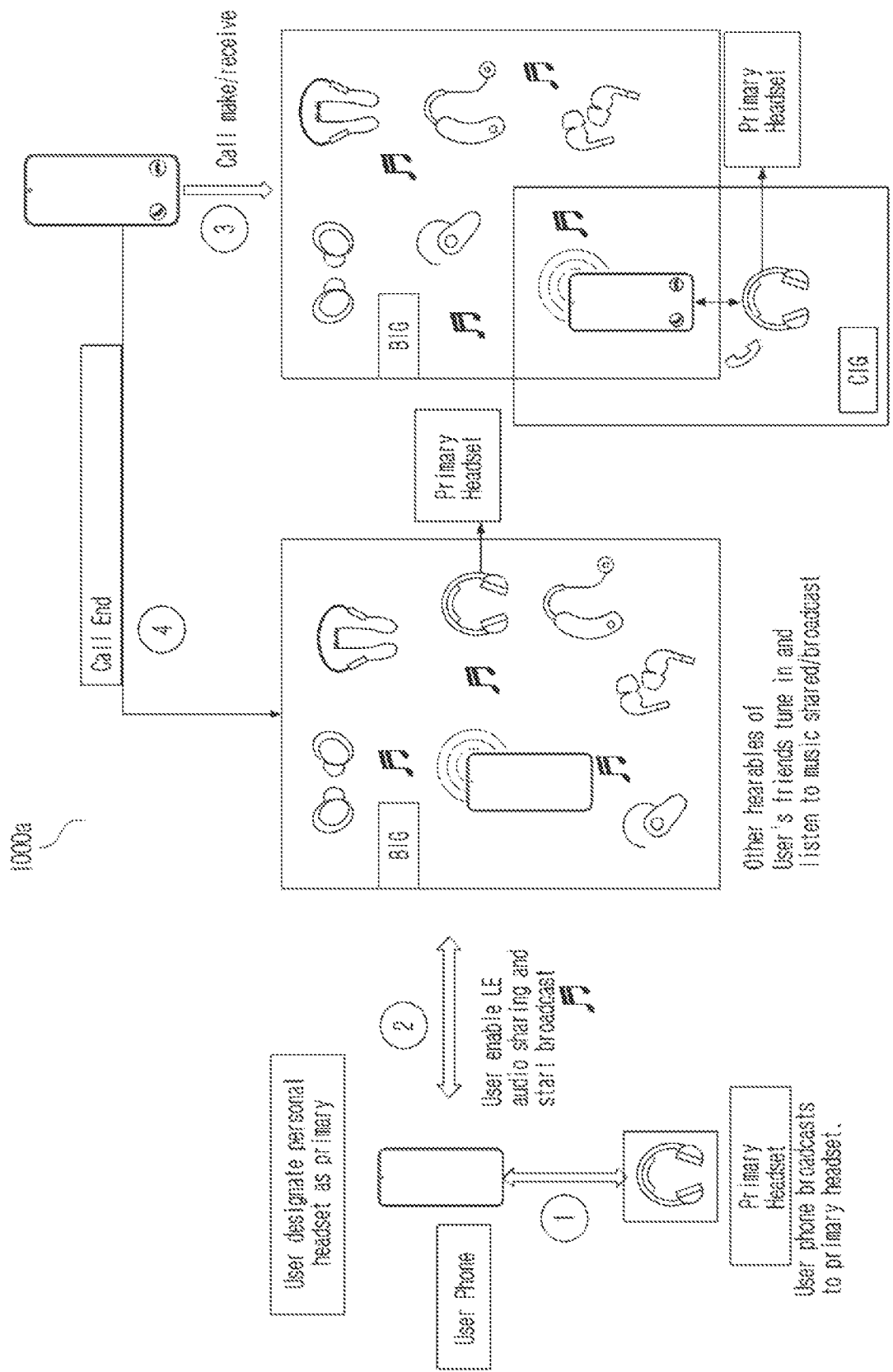
FIG. 6 and FIG. 7 are example scenarios in which the electronic device concurrently routs the LE broadcast media audio and the LE unicast conversational audio, according to an embodiment.
Figure 7:
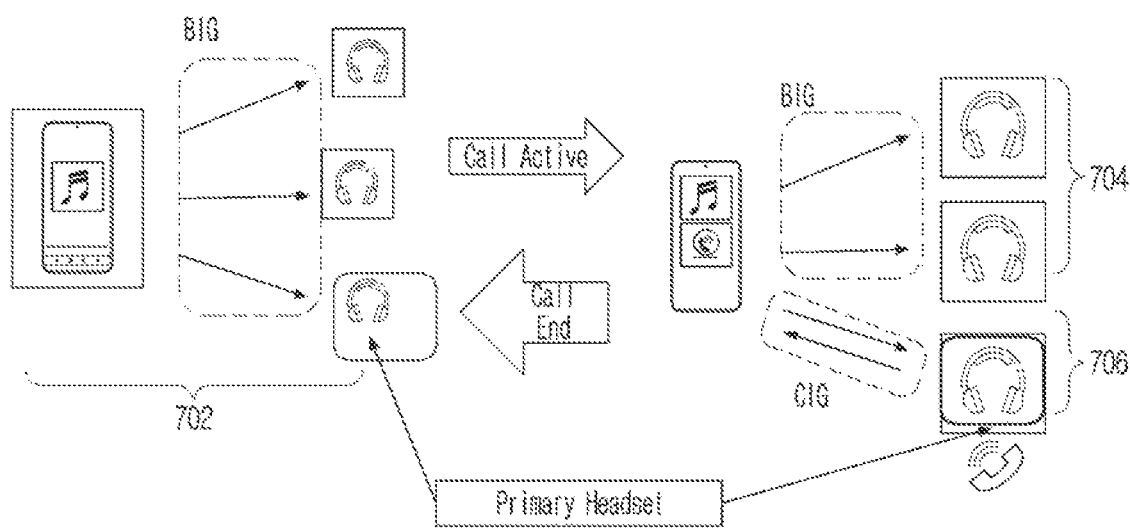

FIG. 6 and FIG. 7 are example scenarios (1000a and 1000b) in which the electronic device (100) concurrently routes the LE broadcast media audio and the LE unicast conversational audio, according to an embodiment.

As shown in the FIG. 6, the user (i.e., Jane) of the electronic device (100) is hosting a party and sharing music from her phone to her group of friends using the LE audio broadcast feature. While Jane and her friends are enjoying the playlist in their LE audio hearables, Jane receives a call on her phone. The call indication is heard only by Jane in her personal headset. While Jane answers the call and converses using her personal headset, her friends continue to enjoy music that is shared from Jane's phone. Once the call is ended, Jane continues listening to the music in her headset in sync with her friends As shown in the FIG. 7, at 702, the music audio sharing via the broadcast audio: the phone use offloading data path (LE audio encoding in a phone DSP). At 704, the broadcast audio streaming—phone use offloading data path (LE audio encoding in phone's DSP). At 706, unicast call audio—phone use legacy data path (LE Audio encoding and decoding in BT Host (AP) of the phone)

Figure 8:
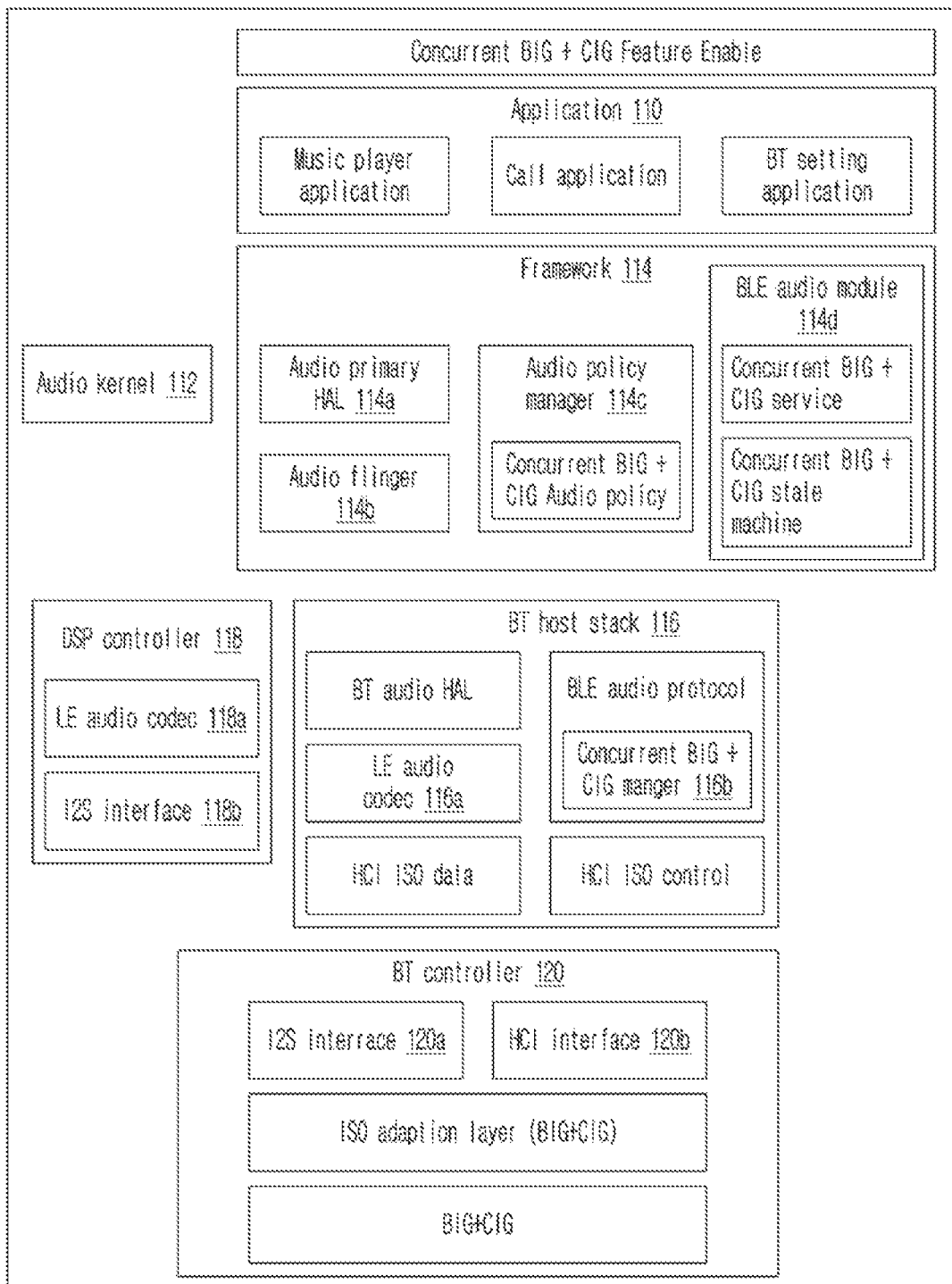
FIG. 8 and FIG. 9 illustrate examples of architecture details of various hardware components of the electronic device for Bluetooth audio multi-streaming, according to an embodiment.
Figure 9:
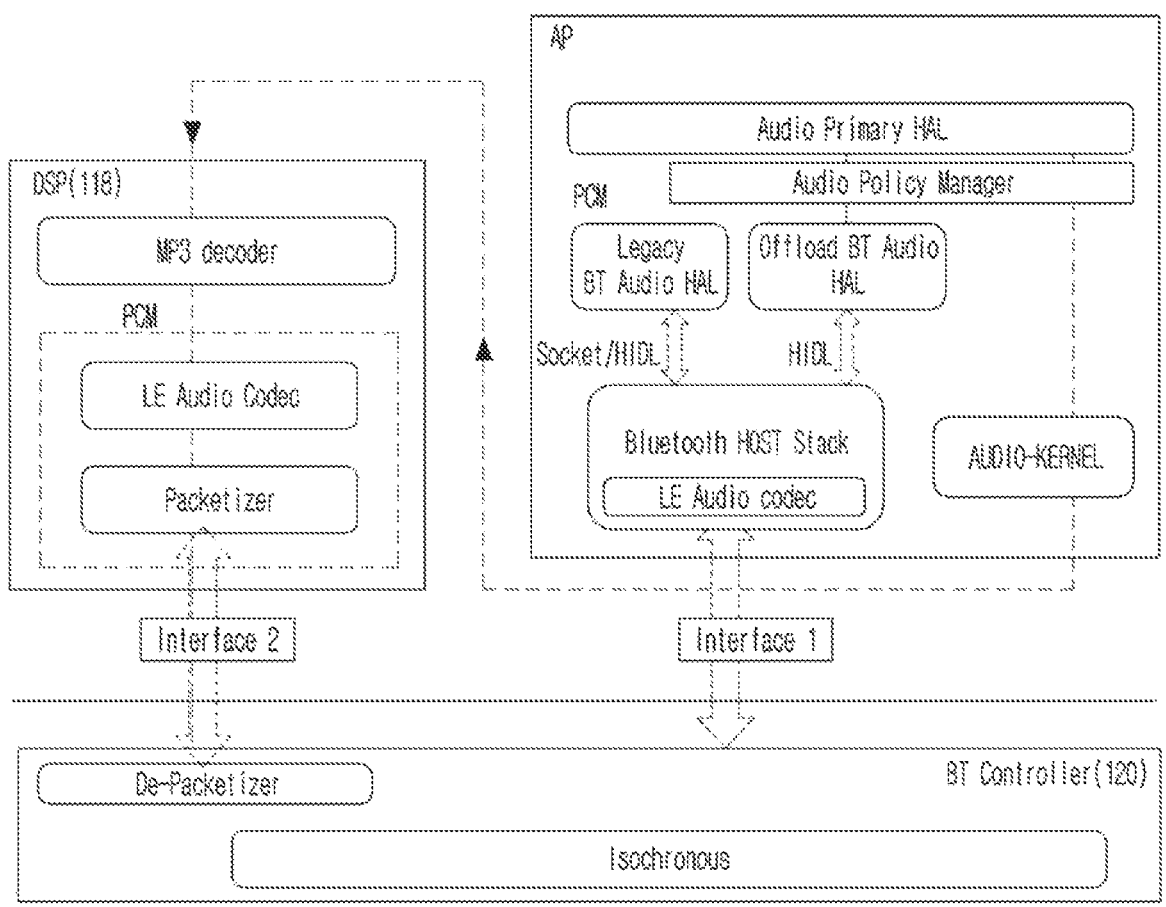

FIG. 8 and FIG. 9 illustrate an example of architecture details of various hardware components of the electronic device (100) for Bluetooth audio multi-streaming, according to an embodiment. FIGS. 8 and 9 will be explained below with additional reference to FIG. 5.

The electronic device (100) of FIG. 5 may further include an application (110) running in the memory (106), an audio kernel (112), a framework (114), a BT host stack (116), the DSP controller (118), and the BT controller (120). The application (110) may be, for example, but is not limited to a music player application, a call application, a BT setting application or the like. The framework (114) may include an audio primary Hardware Abstraction Layer (HAL) (114a), an audio flinger (114b), an audio policy manager (114c) and a BLE audio module (114d). The DSP controller (118) may include a LE audio codec (118a) and an I2S interface (118b). The BT controller (120) includes an I2S interface (120a) and a HCl interface (120b).

Based on the method according to various embodiments, the electronic device (100) including the concurrent BIG and CIG feature enables and disables the concurrent BIG and CIG feature. The user of the electronic device (100) has an option to enable and disable the concurrent BIG and CIG feature. In the enable feature, all the modules will be ready to support simultaneous BIG and CIG. In the disable feature, there is no support for simultaneous BIG and CIG in any module. When disabled, either a call or music—only one may be supported over LE audio.

The BT setting in the electronic device (100) allows the user interface (UX) to control the enable and disable of concurrent BIG+CIG feature. The BT setting also allows the UX to designate any LE audio headset as the primary electronic device. Only one LE headset may be designated as primary headset. The primary headset is a device with which CIG is setup while BIG is active. In some embodiments, the primary headset may also be synced to BIG before CIG is setup. Once CIG is setup with the primary headset, the primary headset saves and removes its sync to the BIG. Once CIG is terminated, the primary headset is able to sync again to phone BIG using the saved information.

In the electronic device (100), a concurrent BIG+CIG service and a concurrent BIG+CIG state machine allows a related art BLE audio service and state machine that do not have states to support concurrent BIG and CIG the ability to support concurrent BIG and CIG. The concurrent BIG+CIG service and concurrent BIG+CIG state machine are a new state machine and service to manage concurrent BIG and CIG connections and interactions with an audio manager. A new state is defined to identify concurrency of BIG and CIG and transitions to and from the concurrent state.

A related art audio policy for the LE audio gives higher preference to call audio when compared to media audio, so that the audio policy manager pauses the media audio when call is active. The method according to various embodiments provides a new concurrent BIG+CIG audio policy that provides equal preference to media audio and call audio when the concurrent BIG+CIG feature is enabled.

A related art implementation provides for only one primary output device for audio TX and RX for the LE audio use case. Based on the enablement of the concurrent BIG+CIG feature and corresponding concurrent BIG+CIG audio policy, the audio HAL will open two output devices for TX (one for call and one for media) and one input device for RX of call data or BLE audio use case simultaneously.

The BT stack may include a concurrent BIG and CIG manager 116*b* to manage both BIG and CIG simultaneously. Both CIG and BIG may be given equal preference. A new state is be defined to identify concurrency of BIG and CIG and transitions to and from the concurrent state.

A new Host Controller Interface (HCI) vendor specific command to inform the BT controller (120) that the BT controller (120) must prepare for simultaneous BIG and CIG. Based on the HCI vendor specific command, the controller (108) opens two interfaces simultaneously for data transfer. In an example, one interface with BT host (122) (as shown in the FIG. 12), another interface with the DSP (118).

For the BT controller (120), an ISO adaptation layer and Isochronous groups, the ISO adaptation layer handles segmentation and reassembly of both call and music audio data at the same time. When call and music both are active, both BIG and CIG are active. A related art BT controller link layer is capable of supporting one of either BIG or CIG operation at a time but not both. The method according to various embodiments, supports concurrent operation for BIG and CIG in the link layer.

The method according to various embodiments enables both music and call applications to run simultaneously using the new concurrent LE audio routing policy. The Bluetooth stack is modified to control both BIG (Broadcasting Audio from phone) and CIG (Transferring call audio to Primary Headset from phone). Both CIG and BIG are given equal preference. The Bluetooth Controller (120) is informed to receive audio data packets from both HCI and I2S interfaces. The ISO adaptation layer receives the audio data packets from both interfaces of BT controller (120) at the same time. Both the BIG and CIG events at the RF side are arranged in sequential or interleaved way to support the use case.

When Music Broadcast BIG is Active: Based on related art methods, when the music is played via BLE Audio Broadcast (BIG), the BIG is set up via the control path from AP>BT controller via the HCI interface. The audio policy manager chooses the LE audio codec in DSP and sets the Data path from AP>DSP>BT controller. The Audio data from Music player is routed from Music app to DSP via the Audio Primary HAL, Audio Flinger and Audio Kernel. After encoding in DSP, the LE audio packets are sent to BT controller via I2S interface. In the BT Controller only BIG exists. The HCI ISO controls the BIG. The ISO adaptation layer converts the LE Audio coded packets into ISO packets and gives the packet to BIG.

When Music Broadcast BIG is Active: based on the method according to various embodiments, when the music is played via BLE Audio Broadcast (BIG), the BIG is set up via the control path from AP>BT controller via HCI. The Audio Policy manager (114*c*) chooses the LE audio codec (118*a*) in the DSP (118) and sets the Data path from AP>DSP>BT controller (120). The Audio data from Music player is routed from the Music app to the DSP controller (118) via the Audio Primary HAL, Audio Flinger and Audio Kernel. After encoding in the DSP controller (118), the LE audio packets are sent to the BT controller (120) via I2S interface (118*b*). In the BT Controller (120) only BIG exists. The HCI ISO controls the BIG. The ISO adaptation layer converts the LE Audio coded packets into ISO packets and gives the packet to BIG.

When Call Unicast CIG become Active: Based on related art methods, while music in on in BIG, and call becomes active, the BLE Audio Framework removes the BIG data path via HCI ISO Control. The Audio policy manager pauses the Music Player app and instead call is made active. The BLE Audio framework then sets up the CIG via HCI ISO Control. The control path for call is from AP>BT Controller via HCI interface. The Audio Policy manager chooses the LE audio codec in DSP for call. The Call Data path is from AP>DSP>BT controller. In the BT Controller only CIG exists. The HCI ISO controls the CIG. The ISO adaptation layer converts the LE Audio coded packets into ISO packets and gives the packet to CIG.

When Music Broadcast BIG and Call CIG both are Active: Based on the method according to various embodiments, while Music in on in BIG, and a call becomes active, the BLE Audio Framework does not remove the BIG data path. Instead an additional CIG is setup via HCI ISO Control. The Audio policy manager (114*c*) does not pause the Music Player app. The audio policy manager (114*c*) chooses to apply the new audio policy for simultaneous routing of music and call audio data. The Call Audio Data path is from AP (BT HOST HCI)>BT controller, whereas the Music Audio Data path is from AP>DSP>BT Controller. The control path for both music and call are from AP>BT Controller via HCI interface. In the BT Controller (120) now both BIG and CIG exist. The HCI ISO controls both the BIG and the CIG. The ISO Adaptation Layer is modified to process LE Audio data packets from both I2S Interface and HCI Interface.

As shown in the FIG. 9, the interface 1 represents the interface between a BT host stack (116) in an application processor (AP) and the BT controller (120). The LE audio codec resides in the BT host stack (116). Interface 2 is the interface between Digital Signal Processor (DSP) (118) and the BT controller (120). The DSP (118) may be an audio DSP. The LE audio codec resides in the DSP (118). Interface 3 is an interface between a modem and the BT Controller (120). In this case, the LE audio encoding and decoding is done in the BT controller (120). Below are Combinations of interfaces:

| Use Case | Interface 1 | Interface 2 | Interface 3 |
|---|---|---|---|
| LE Audio | Broadcast Media | | Unicast Voice |
| Broadcast and | | Broadcast Media | Unicast Voice |
| Modem Call | Broadcast Media | Unicast Voice | |
| | Unicast Voice | Broadcast Media | |
| LE Audio | Broadcast Media | Unicast Voice | |
| Broadcast and | Unicast Voice | Broadcast Media | |
| VoIP Call | | | |
| Voice | Broadcast Media | Unicast Voice | |
| Recognition | Unicast Voice | Broadcast Media | |

For example, let a music broadcast data path from an application to the BT controller (120) use offload HAL, encoding of music packets in DSP (hardware encoding), I2S interface to send encoded data from the DSP to the BT controller (120). When a call is active, the call audio data path from call app to BT controller (120) will use primary HAL, encoding and decoding of call voice packets in BT host layer of application processor (software encoding/decoding), and UART interface for TX/RX of encoded voice packets between the BT host (122) and the BT controller (120).

There exists a separate and independent data path for call data and broadcast data inside the phone simultaneously when the call is active during music playback. After the call ends, the unicast link between primary headset and Phone (the CIG) is dismantled. If the phone's BIG is still active, then the phone will automatically add the primary headset into the BIG.

Some of the procedures are as follows—
1. The BT controller (120) sends and receives data simultaneously over two interfaces in any of these combinations:
   a. Broadcast Audio Data path from the DSP (118) to BT controller (120) (Media encoding in DSP) & Call audio data path between the BT host (122) in the application processor and the BT controller (120) (Call audio encoding/decoding in BT Host)
   b. Broadcast Audio Data path from DSP (118) to the BT controller (120) (Media encoding in DSP) & Call audio data path between communication processor and BT controller (Call audio encoding/decoding in BT Controller)
   c. Broadcast Audio Data path from BT Host to BT controller (Media encoding in BT Host) & Call audio data path between communication processor and BT controller (Call audio encoding/decoding in BT Controller)
   d. Broadcast Audio Data path from BT Host to BT controller (Media encoding in BT Host) & Call audio data path between DSP and BT controller (Call audio encoding/decoding in DSP)
2. The bit rate for broadcast audio is decreased to maintain the quality of broadcast media when a call is in progress. After the call ends, the bitrate is restored to its original value.
3. The BT controller (120) sends unicast packets and broadcast advertisement packets over isochronous channels. The controller employs interleaving and overlapping of CIG and BIG events and sub-events to achieve transmission over isochronous channels.

Figure 10:
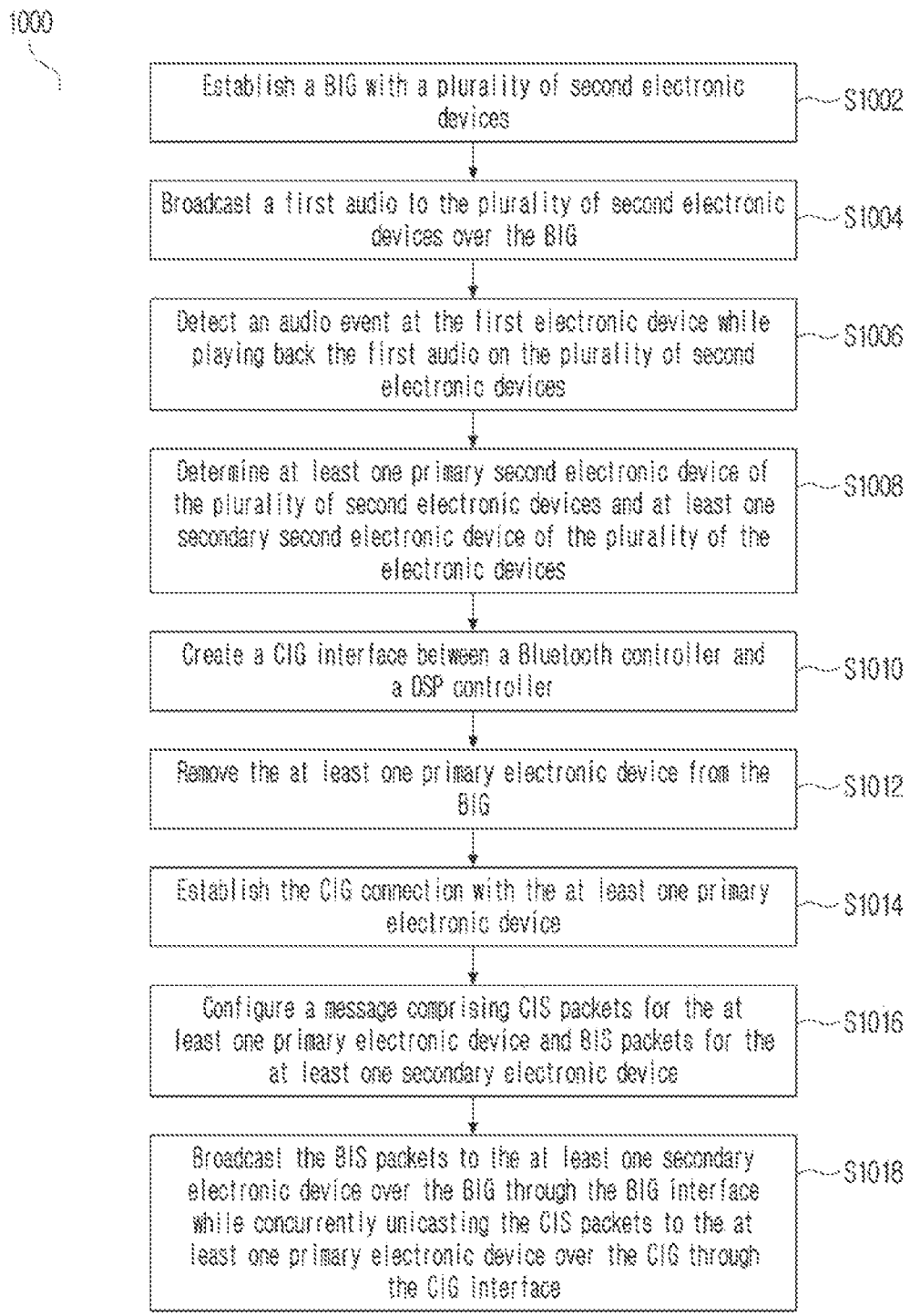
FIG. 10 is an example of a flow chart illustrating a method for Bluetooth audio multi-streaming, according to an embodiment.

FIG. 10 is an example of a flow chart (S1000) illustrating a method for Bluetooth audio multi-streaming, according to an embodiment. The operations (S1002-S1018) are performed by the Bluetooth audio multi-streaming controller (108).

At S1002, the method includes establishing the BIG with the plurality of second electronic devices (200a-200n). At S1004, the method includes broadcasting the first audio to the plurality of second electronic devices (200a-200n) over the BIG. At S1006, the method includes detecting the audio event at the first electronic device (100) while playing back the first audio on the plurality of second electronic devices (200a-200n).

At S1008, the method includes determining the at least one primary second electronic device of the plurality of second electronic devices (200a-200n) and at least one secondary second electronic device of the plurality of the electronic devices(200a-200n). At S1010, the method includes creating the CIG interface between the Bluetooth controller and a DSP controller. At S1012, the method includes removing the at least one primary electronic device from the BIG. At S1014, the method includes establishing the CIG connection with the at least one primary electronic device.

At S1016, the method includes configuring the message comprising CIS packets for the at least one primary electronic device and BIS packets for the at least one secondary electronic device. At S1018, the method includes broadcast the BIS packets to the at least one secondary electronic device over the BIG through the BIG interface while concurrently unicasting the CIS packets to the at least one primary electronic device over the CIG through the CIG interface.

Figure 11:
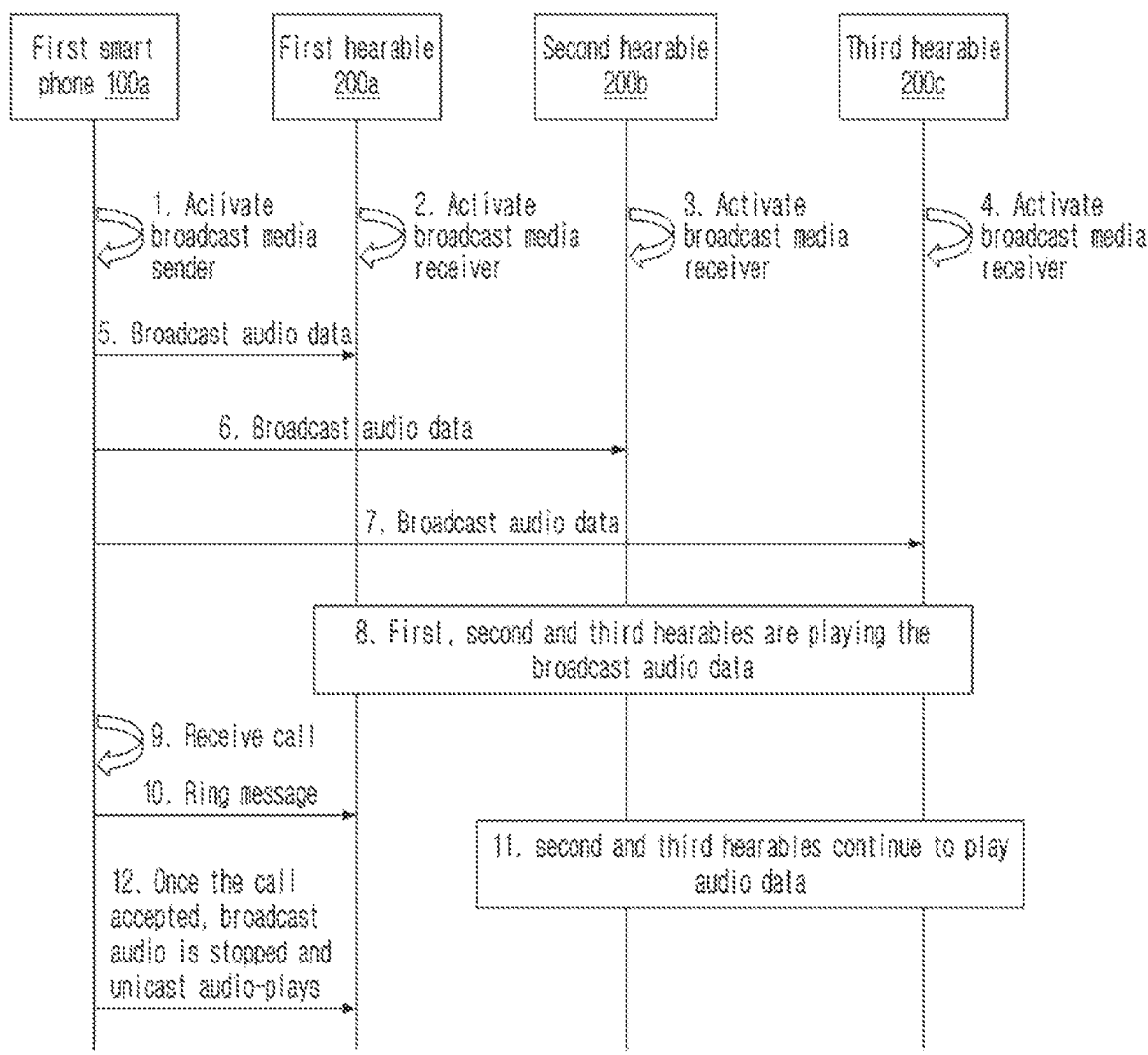
FIG. 11 illustrates an example of a sequence diagram of a method for concurrently routing LE broadcast media audio and a LE unicast conversational audio, according to an embodiment.

FIG. 11 illustrates an example of a sequence diagram of method for concurrent routing of LE broadcast media audio and the LE unicast conversational audio, according to an embodiment.

At 1, the first smart phone (100a) activates the broadcast media sender. At 2, the first hearable (200a) activates the broadcast media receiver. At 3, the second hearable (200b) activates the broadcast media receiver. At 4, the third hearable (200c) activates the broadcast media receiver.

At 5, the first smart phone (100a) sends the broadcast audio data to the first hearable (200a). At 6, the first smart phone (100a) sends the broadcast audio data to the second hearable (200b). At 7, the first smart phone (100a) sends the broadcast audio data to the third hearable (200c). At 8, the first, second and third hearables (200a-200c) are playing the broadcast audio data.

At 9, the first smart phone (100a) receives the call. At 10, the first smart phone (100a) sends a ring message to the first hearable (200a). At 11, the second and third hearables (200b and 200c) continue to play the audio data. At 12, Once the call accepted, the broadcast audio is stopped for the first hearable 200a and unicast audio plays at the smart phone (100a) (i.e., the unicast audio of the call is sent to the first hearable 200a).

Figure 12:
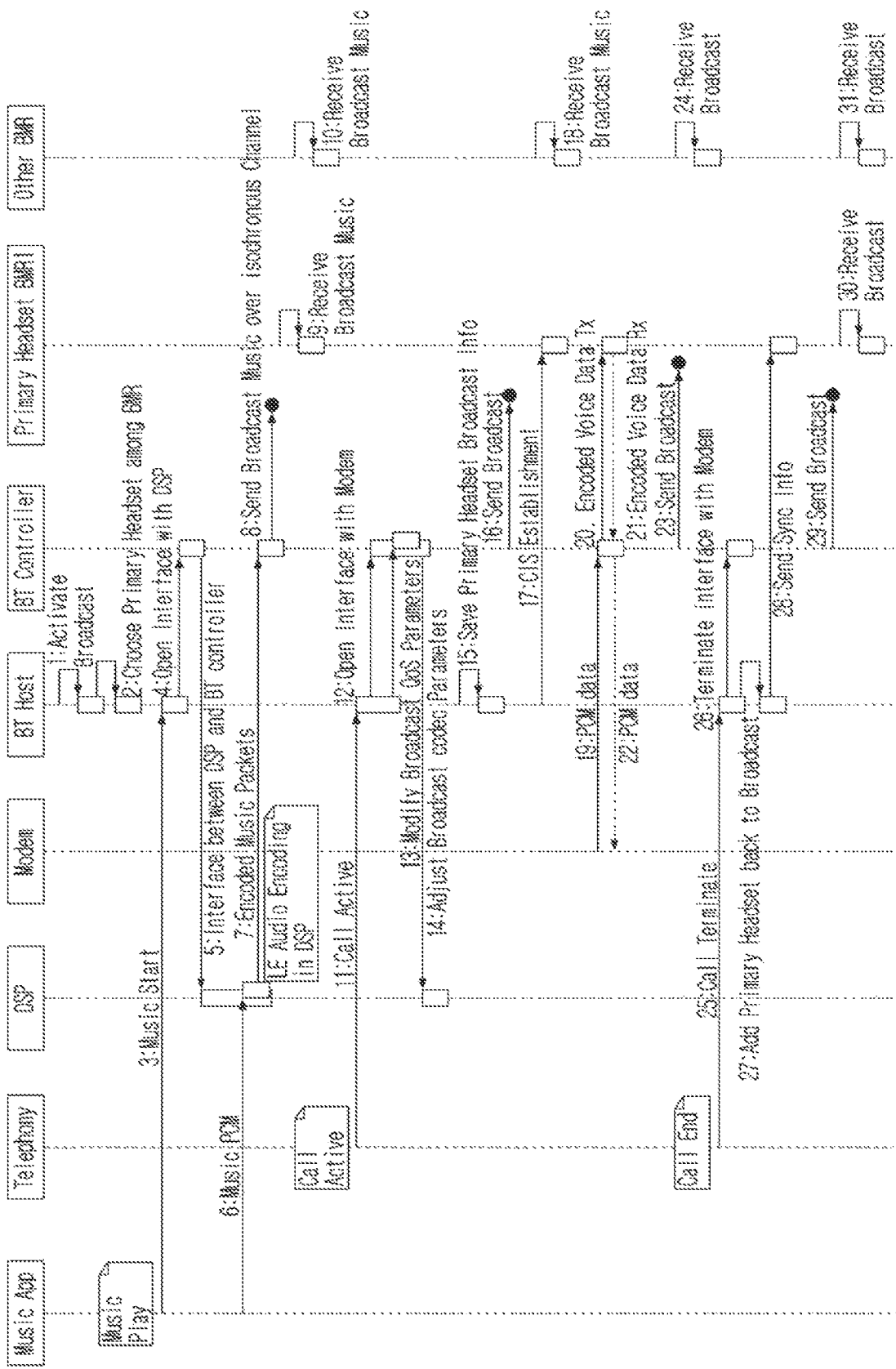
FIG. 12 and FIG. 13 illustrate example sequence flow diagrams showing a simultaneous coexistence of two independent data paths existing on a smart phone for transfer of media and voice data to a BT controller, according to an embodiment.
Figure 13:
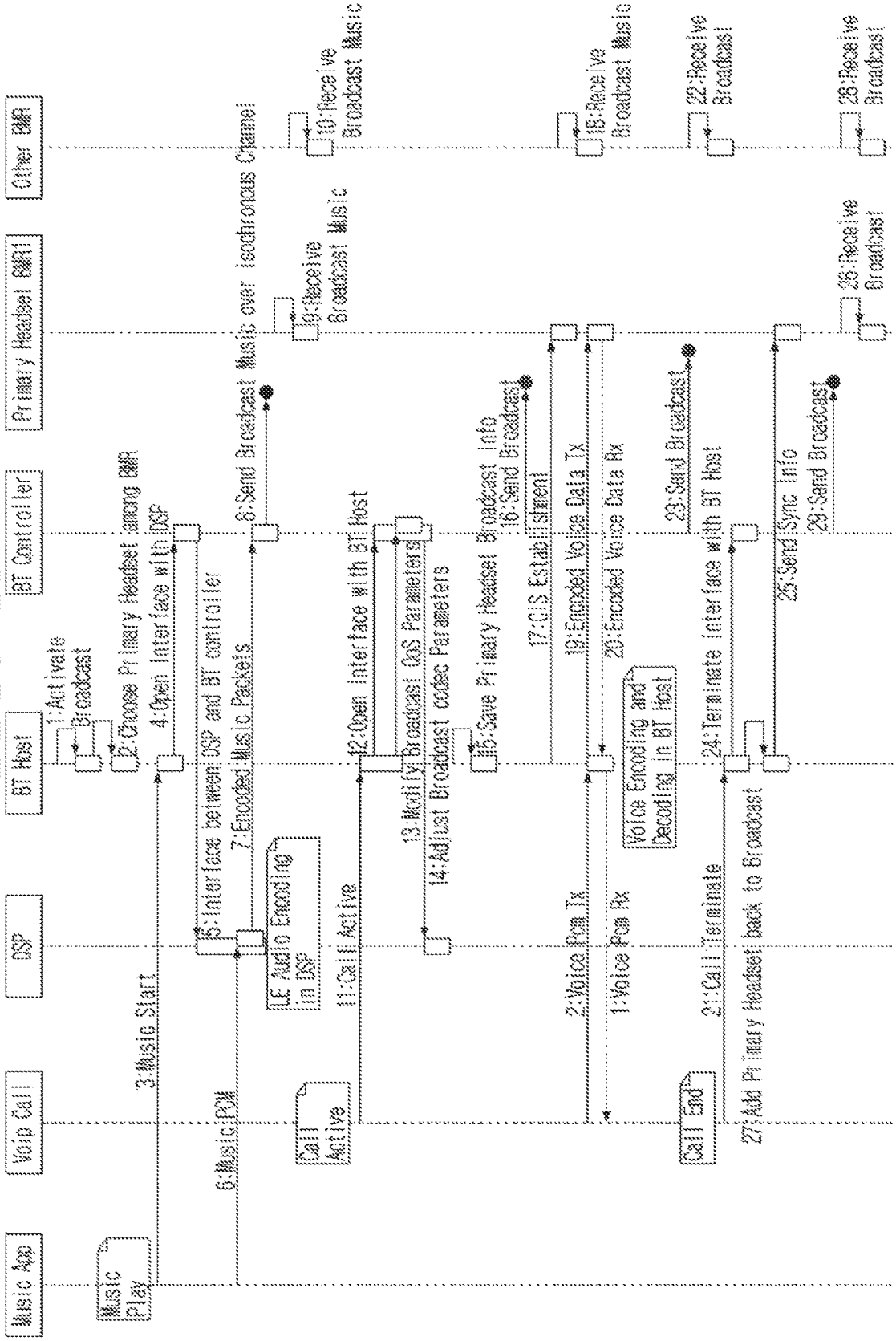

FIG. 12 and FIG. 13 illustrate example flow diagrams showing a simultaneous coexistence of two independent data paths existing on a smart phone for transfer of media and voice data to the BT controller (120), according to an embodiment.

As shown in the FIG. 12, consider, there exist two active interfaces with the BT controller (120). The interface at the DSP (118) and the BT controller (120) is used for sending the LE audio encoded media data packets to the BT controller (120). The LE audio encoder in the DSP (118) encodes the media PCM data. After encoding the, the encoded data packets are sent to the BT controller (120). At the same time, when modem call is active, the interface at the modem (124) and the BT controller (120) is also active. The voice pcm is sent and received to the BT controller (120) via the PCM interface. The encoding in this case happen in BT controller (120). There is data flow over both interfaces with BT Controller at same time.

As shown in the FIG. 12, at 1, the BT host (122) activates the broadcast. At 2, the BT host (122) selects the primary headset among the BMR. At 3, the music application starts the music and sends the signal associated with the music to the BT host (122). At 4, the BT host (122) opens the interface with the DSP (118) using the BT controller (120). At 5, the BT controller (120) interfaced with the DSP (118). At 6, the music application sends the music PCM to the DSP (118). The LE audio encoded in the DSP (118). At 7, the DSP (118) share the encoded music packets to the BT controller (120). At 8, the BT controller (120) broadcasts the music over the isochronous channel. At 9, the primary headset BMR1 receives the broadcast music. At 10, other headset BMR receives the broadcast music. The call application activates the call. At 11, the call application sends the signal with the BT controller (120). At 12, the BT controller (120) opens the interface with the modem (124). At 13, BT host (122) modifies the broadcast QoS parameter. At 14, the BT controller (120) adjusts the broadcast codec parameter.

At 15, the BT host (122) saves the primary headset parameter. At 16, the BT controller (120) sends the broadcast. At 17, the BT host (122) performs the CIS establishment with the primary headset. At 18, the other headset BMR receives the broadcast music. At 19, the modem (124) sends the PCM data to the BT controller (120). At 20, the BT controller (120) sends the encoded voice data transmission (Tx) to the primary headset BMR1. At 21, the primary headset BMR1 sends the encoded voice data Rx to the BT controller (120). At 22, the BT controller (120) sends the PCM data to the modem (124). At 23, the BT controller (120) sends the broadcast. At 24, the other headset BMR receives the broadcast. The call ends at the call application. At 25, the telephony application sends the signal corresponding to the call termination to the BT host (122). At 26, the BT host (122) terminates the interface with the modem (124). At 27, BT host (122) adds the primary headset back to the broadcast. At 28, the BT host (122) sends the synchronization information to the primary headset. At 29, the BT controller (120) sends the broadcast. At 30, the primary headset BMR1 receives the broadcast. At 31, the other headset BMR receives the broadcast.

As shown in the FIG. 13, there exist two active interfaces with the BT controller (120). The interface at the DSP (118) and the BT controller (120) is used for sending LE Audio Encoded media data packets to the BT controller (120). The LE Audio Encoder in DSP encodes the media PCM data. After encoding the, the encoded data packets are sent to the BT controller (120). At the same time, when VoIP call is active, the interface at BT host (122) and the BT controller (120) is also active. The voice PCM is sent and received by the BT host (122). The BT host (122) encodes the PCM data received by it and sends it to the BT controller (120) via this interface. The BT host (122) also received encoded voice data from the BT controller (120), decodes it. There is data flow over both interfaces with the BT Controller (120) at same time.

As shown in the FIG. 13, at 1, the BT host (122) activates the broadcast. At 2, the BT host (122) selects the primary headset among the BMR. At 3, the music application starts the music and sends the signal associated with the music to the BT host (122). At 4, the BT host (122) opens the interface with the DSP (118) using the BT controller (120). At 5, the BT controller (120) is interfaced with the DSP (118). At 6, the music application sends the music PCM to the DSP (118). The LE audio encoded in the DSP (118). At 7, the DSP (118) shares the encoded music packets to the BT controller (120). At 8, the BT controller (120) broadcasts the music over the isochronous channel. At 9, the primary headset BMR1 receives the broadcast music. At 10, other headset BMR receives the broadcast music. The call application activates the call. At 11, the call application sends the signal with the BT host (122). At 12, the BT host (122) opens the interface with the BT controller (120). At 13, BT host (122) modifies the broadcast QoS parameter. At 14, the BT controller (120) adjusts the broadcast codec parameter with the DSP (118).

At 15, the BT host (122) saves the primary headset parameter. At 16, the BT controller (120) sends the broadcast. At 17, the BT host (122) performs the CIS establishment with the primary headset. At 18, the other headset BMR receives the broadcast music. At 19, the voice call application sends the voice PCM data to the BT controller (120). The BT controller (120) sends the encoded voice data transmission (Tx) to the primary headset BMR1. At 20, the primary headset BMR1 sends the encoded voice data Rx to the BT controller (120). The BT controller (120) sends the PCM data to the voice call application. At 22, the other headset BMR receives the broadcast upon the BT controller (120) sends the broadcast at 23. At 21, the call ends at the call application. The call application sends the signal corresponding to the call termination to the BT host (122). At 24, the BT host (122) terminates the interface with the BT controller (120). At 25, the BT host (122) sends the synchronization information to the primary headset. At 27, BT host (122) adds the primary headset back to the broadcast. At 26, the primary headset BMR1 receives the broadcast and at 28, the other headset BMR receives the broadcast upon the BT controller (120) sends the broadcast at 29.

Figure 14:
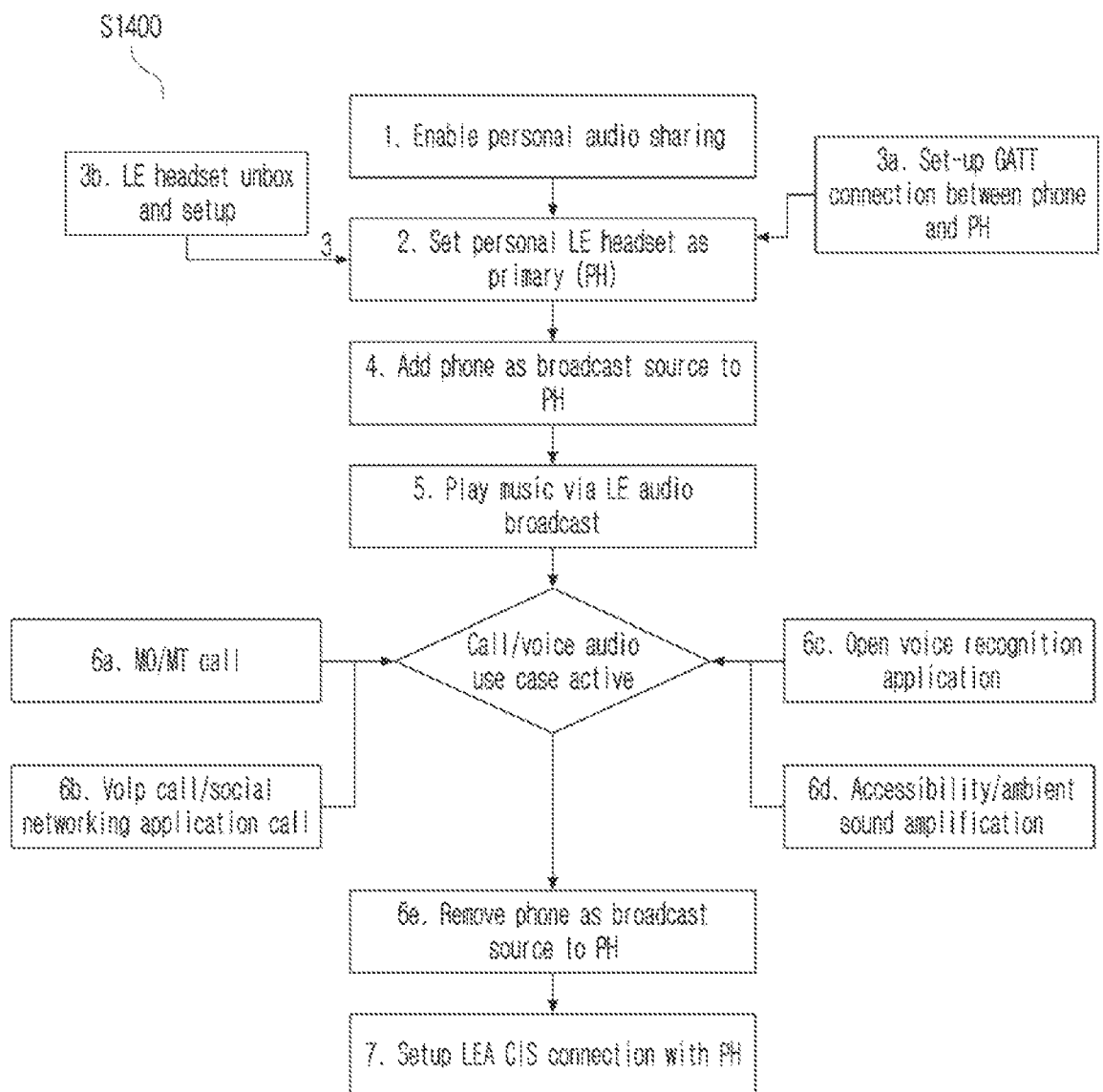
FIG. 14 to FIG. 16 illustrate example flow charts of a method for concurrently routing the LE broadcast media audio and the LE unicast conversational audio, according to an embodiment.
Figure 15:
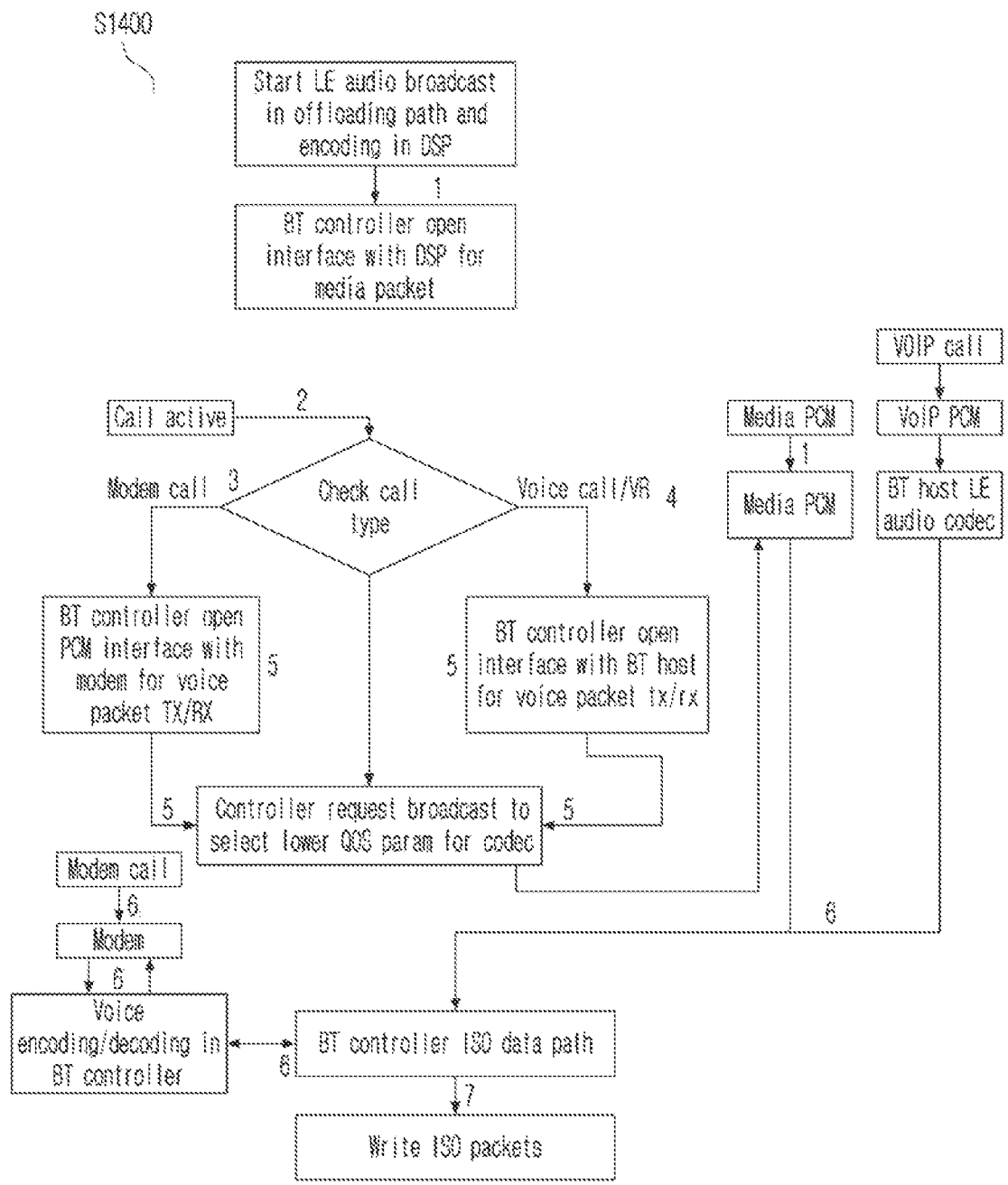
Figure 16:
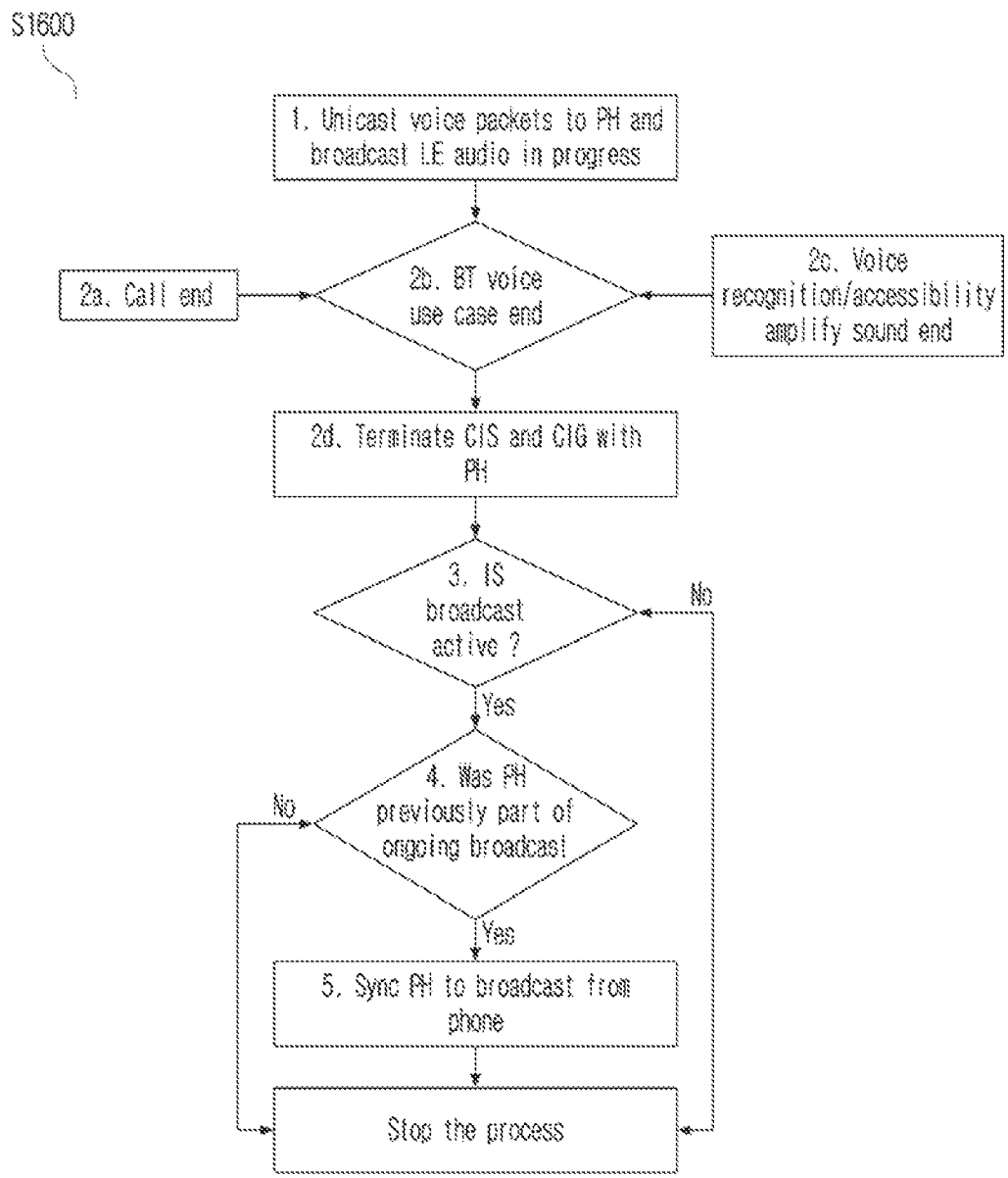

FIG. 14 to FIG. 16 illustrate example flow charts (S1400-S1600) of a method for concurrent routing of the LE broadcast media audio and the LE unicast conversational audio, according to an embodiment.

As shown in the FIG. 14, at 1, the user of the electronic device (100) enables personal audio sharing on his phone. At 2, the user sets his personal LE Headset as a Primary Headset (PH) in Phone's BT Settings UI. The user sets his personal LE Headset as the PH either at the time of unbox of his LE Audio Headset or dynamically at any other time. The user can change his choice of PH at any time. When a new headset us set as PH, the previous PH is treated like any other LE headset. At 3a, the phone sets up GATT connection with the PH. The phone acts as Broadcast Audio Scan Service (BASS) Client to the PH. At 3b, the LE headset unboxes and setup is done. At 4, the user adds phone as broadcast source so that the PH may sync with phone's broadcast. At 5, the phone plays music and the PH and other nearby headsets listen to music broadcast by Phone. At 6a-6d, when the call audio or voice use case become active—either during an MO/MT call, VoIP call, voice recognition, accessibility ambient sound amplification, the PH, if synced to ongoing broadcast by the phone, is removed from the broadcast group. Before that, the PH details, Broadcast Source Stream Endpoints related information, Periodic Sync Transfer information relevant to PH in the ongoing broadcast is saved by the phone. At 7, the phone setups CIS and CIG with PH. PH is now ready to participate in unicast TX/RX of voice packets with phone.

Based on the method according to various embodiments, user's personal LE headset may be designated as a primary Headset to which call/voice audio may be routed to when broadcast audio is active and parameters that are proof of PH being a previously synced to ongoing broadcast may be saved.

As shown in the FIG. 15, at 1, when the LE audio broadcast start with the play music, the BT controller (120) open an interface with the DSP (118). The interface could be I2S or any other. The BT controller (120) prepares to receive encoded media packet from the DSP (118). At 2, when the call/voice use case become active, the phone checks the type of use case. At 3, if the modem call, the BT controller (120) opens a pcm interface to send and receive call audio packets. Alternately, the BT controller (120) may open an interface to send and receive call audio packets via the BT host. At 4, if VoIP call or voice recognition use case, the BT controller (120) opens an interface to send and receive voice packets via the BT host (122).

At 5, when the BT controller (120) opens two interfaces for packet transfer, and one of the two interfaces is transmitting the broadcast data, the controller signals the LE audio encoder in the DSP (118) to change LE audio codec parameters such as bitrate to a lower value and the codec QoS config is also set to lower levels. The CIG and BIG QoS configuration are also changed to accommodate both BIG and CIG events. At 6, the media packets for broadcast are routed from media app to a DSP encoder and then to the BT controller (120). The VoIP or voice pcm packets are routed from VoIP calling app to the BT host (122) to the BT controller (120), the reverse path also included. The modem call packets are routed to and from the modem (124) via encoder in the BT controller (120) and isochronous layer. At 7, the controller interleaves and writes the media (BIS) and voice (CIS) packets and sends them over the air.

Based on the method according to various embodiments, multiple audio use cases and routing paths are simultaneously active for broadcast music and VoIP call/modem call/voice recognition. The controller indicates the DSP encoder to adjust the QoS parameters associated with LE audio codec when simultaneous unicast call is active. The controller can interleave and send BIS and CIS packets in a single ISO interval for optimum bandwidth utilization.

As shown in the FIG. 16, at 1, broadcast music and unicast voice TX/RX in progress. At 2a-2d, when unicast voice TX/RX use case end, the unicast Connected Isochronous Stream (CIS) and Connected Isochronous Group (CIG) with primary headset (PH) is terminated. At 3, the smart phone checks whether broadcast is still ongoing and active on the smart phone. If no, then end of process. At 4, if yes, then the phone checks if the PH was previously part of that active broadcast. At 5, if yes, then the phone syncs the PH to the broadcast audio with the help of information saved when PH left Broadcast group.

Based on the method according to various embodiments, after the CIS and the CIG are terminated, the phone checks if broadcast active and if PH was previously part of any ongoing broadcast. The phone automatically synchronizes PH to ongoing broadcast using saved broadcast parameters.

Figure 17:
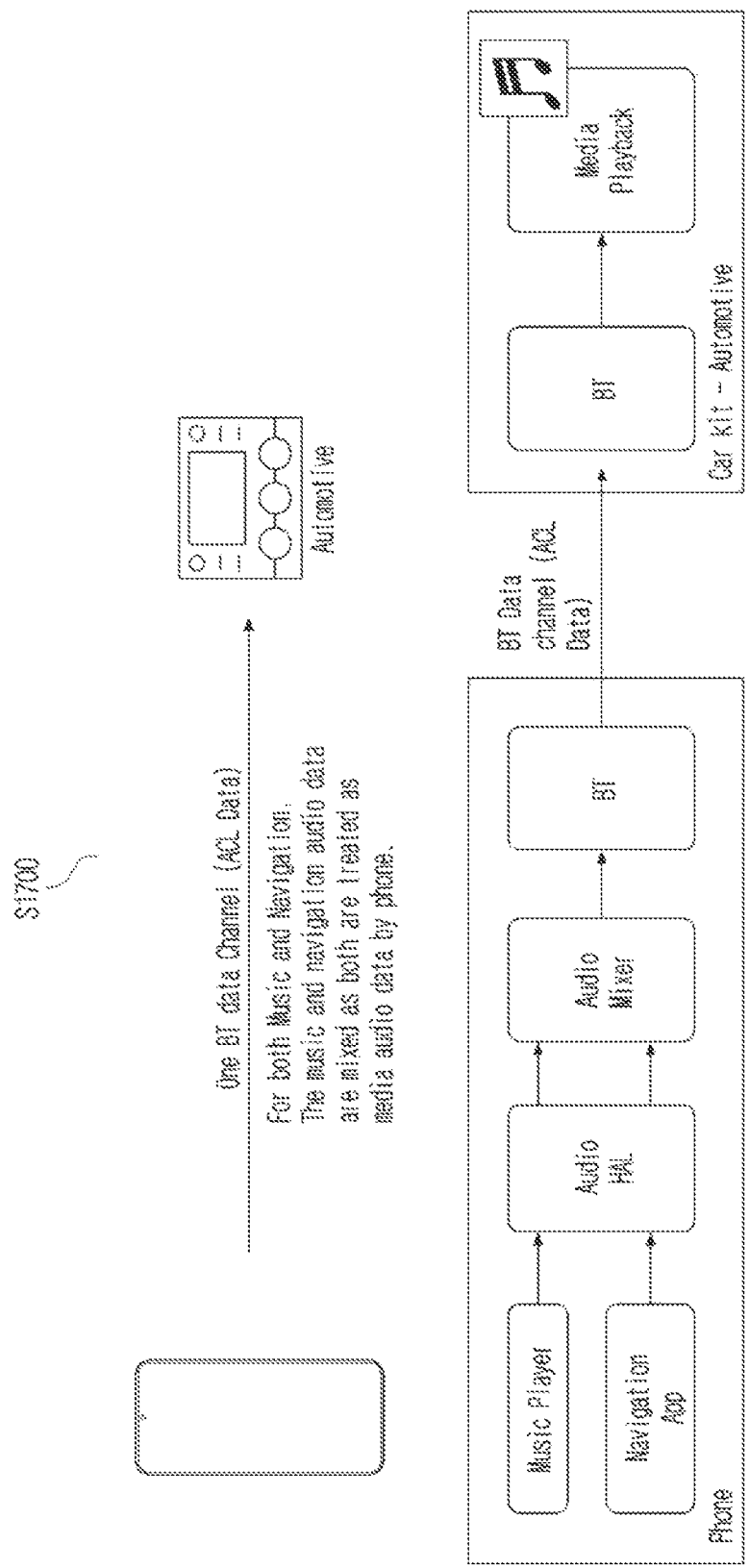
FIG. 17 and FIG. 18 illustrate an example of a Bluetooth classic scenario.
Figure 18:
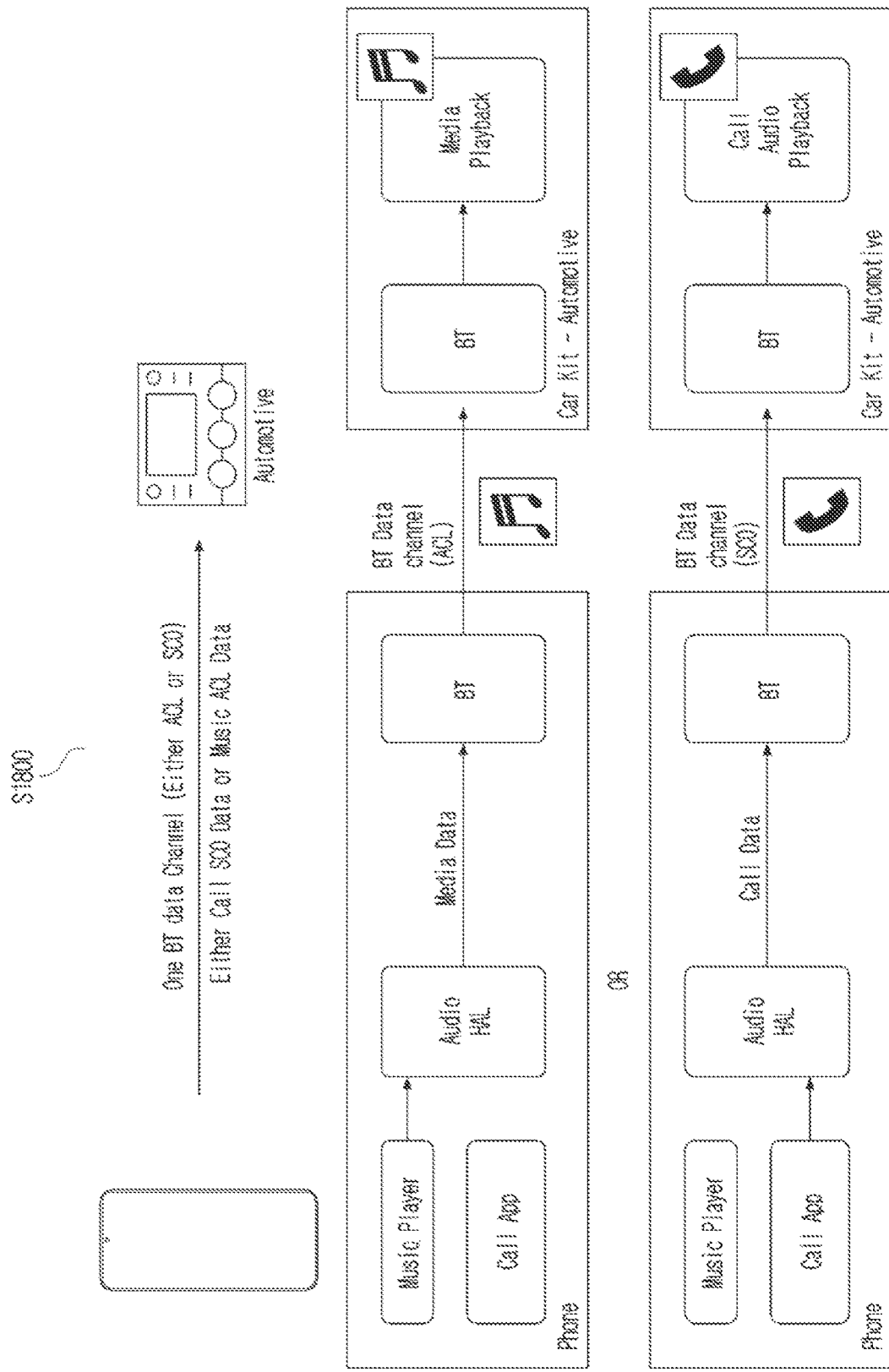

FIG. 17 and FIG. 18 illustrate (S1700 and S1800) a Bluetooth classic scenario.

Music+Navigation Scenario: As shown in the FIG. 17, in the Bluetooth classic scenario, there are different types of data traffic out of which Asynchronous connection Less (ACL) used for music in Music and Navigation scenario and Synchronous Connection Oriented (SCO) which is usually used for Call scenario. Let's suppose that music application generates audio stream and that is sent over an ACL. When Navigation application wants to send audio stream, the Navigation application sends the data over existing ACL itself. Both audio from Music application and Navigation application are mixed and played on same ACL. Audio streams are mixed at the audio framework and carried by the same ACL so it is essentially a single data stream.

Music+Call Scenario: As shown in the FIG. 18, Phone & Carkit are the two BT devices involved in this scenario. Music data from phone is played on carkit speaker and similarly navigation audio data is played on the same carkit speaker because of both are ACL traffic. If there is an incoming/outgoing call to Phone, then the music data is paused and call data is streamed to the carkit because call is SCO traffic. There is only one either ACL or SCO will be active at any point of time.

Figure 19:
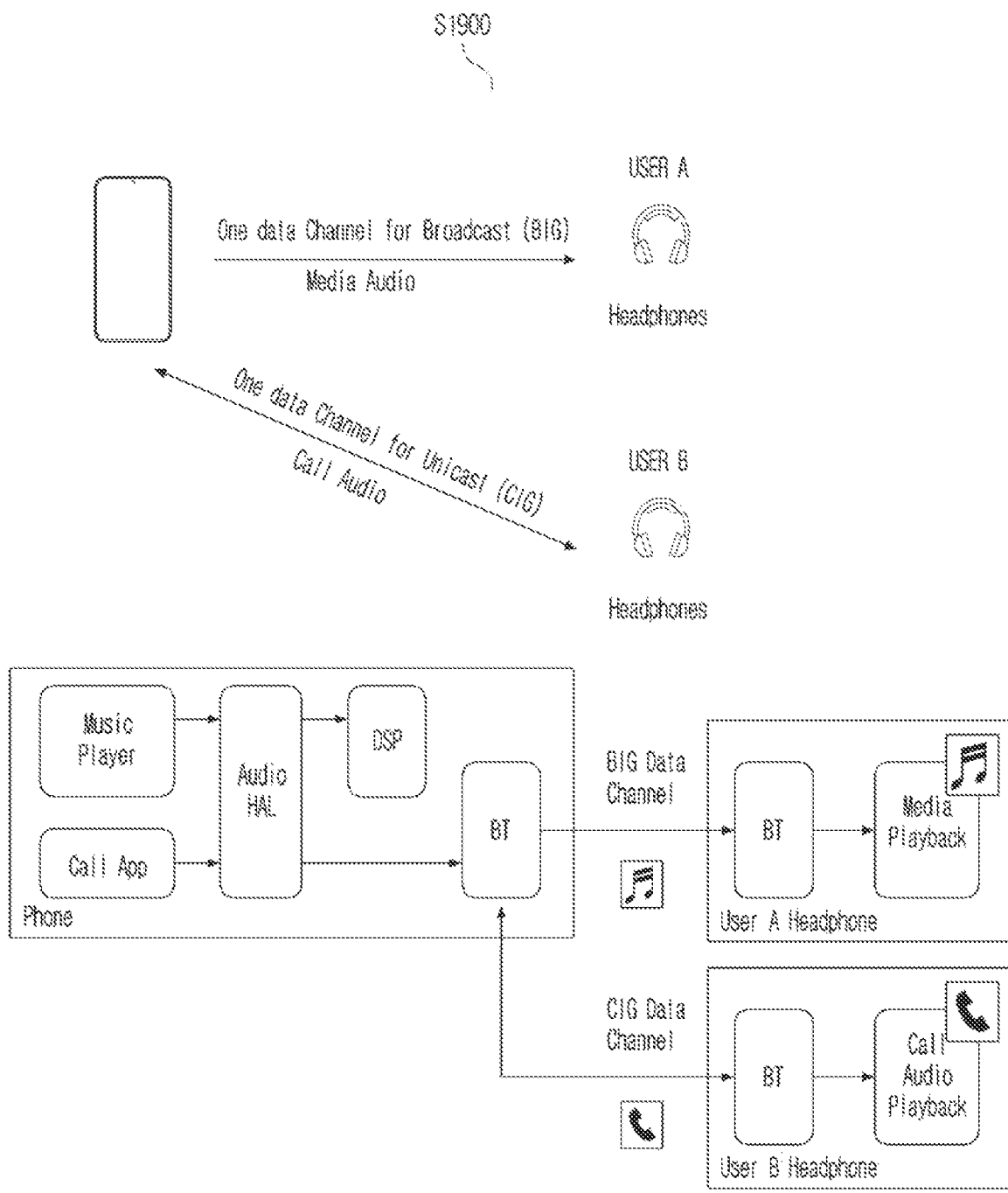
FIG. 19 illustrates an example of a Bluetooth LE audio scenario with BIG and CIG, according to an embodiment.

FIG. 19 illustrates a Bluetooth LE audio scenario (S1900) with BIG and CIG, according to an embodiment.

Broadcast Music+Call Scenario in LE Audio: As shown in the FIG. 19, the LE audio has enabled music broadcast via the BIG. Phone as an audio source can broadcast music to nearby users. Let's suppose that the nearby users listening to music are user A, user B from Phone. So Phone's Music application generated audio stream is broadcasted via data channels used by BIG. The broadcasted music corresponds to one data stream from the Phone.

When there is an incoming/outgoing call to/from Phone which is already acting as a broadcast source, the data stream corresponding to music broadcast from Phone will continue on existing BIG to user A. There is a new data stream for call audio that is created from Phone to user B. Now, there are essentially two separate data streams. Audio streams from Phone for call and music are not mixed but routed to different devices using CIG & BIG respectively. Call data stream is routed to User B Broadcasted music data stream is routed to the user A.

Figure 20A:
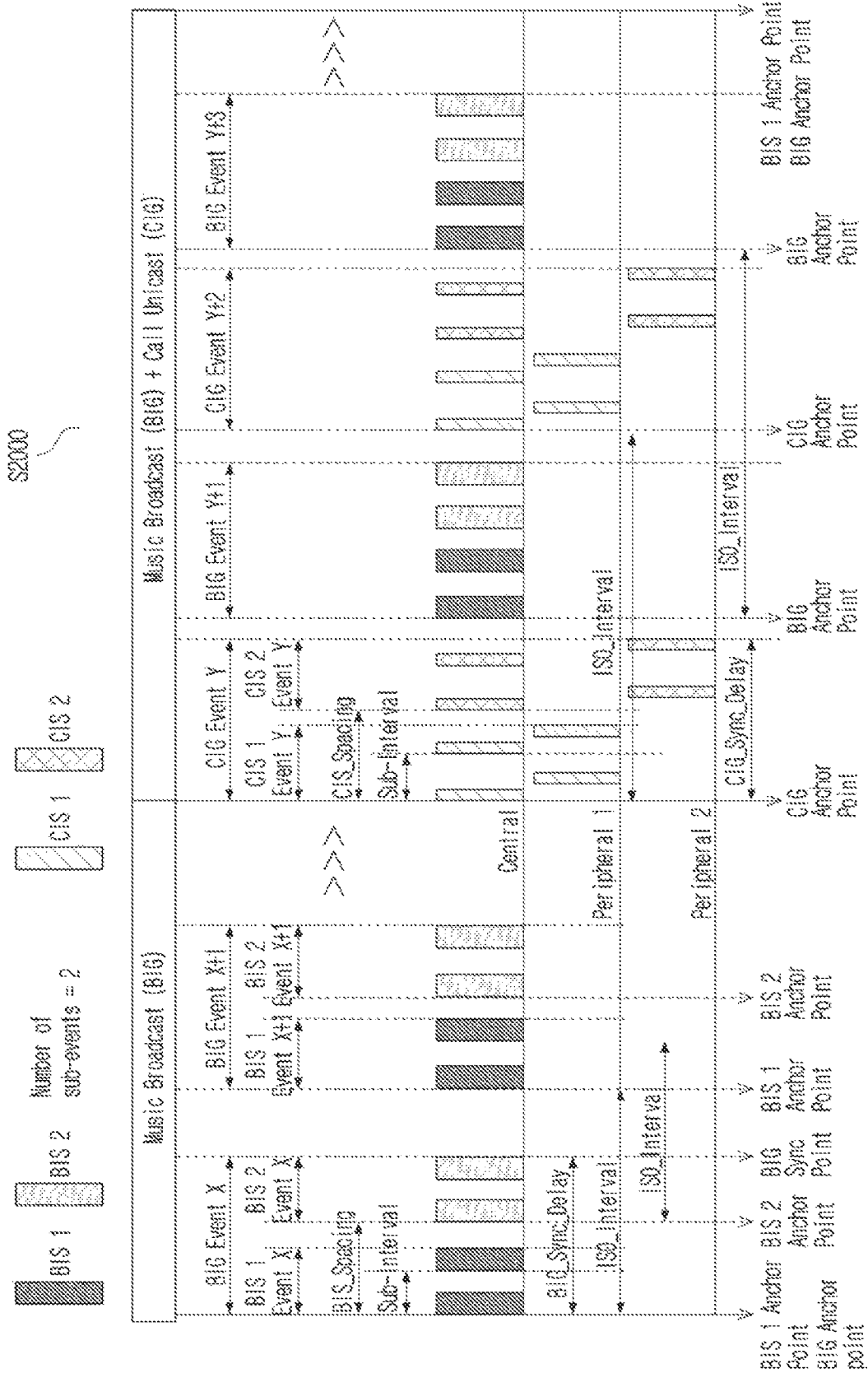
FIGS. 20A and 20B (FIG. 20B being a continuation of the right side of FIG. 20A) illustrate an example of CIG and BIG sequential events and packet arrangement, according to an embodiment.
Figure 20B:
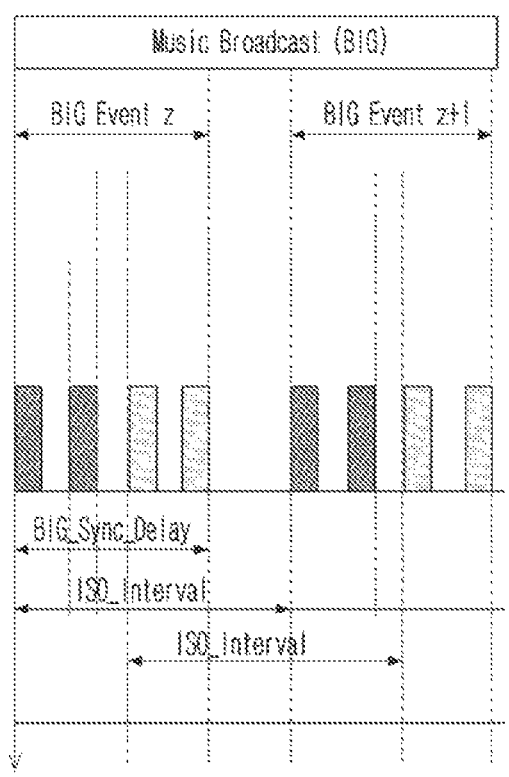

FIGS. 20A and 20B illustrate an example of CIG and BIG sequential events and packet arrangement (S200), according to an embodiment. FIG. 20B is a continuation of FIG. 20A and shows a portion to the right of FIG. 20A.

As shown in FIGS. 20A-20B, during music broadcast, the packets are transferred in BIS sub-events and BIG events. All BIS 1 packets in BIG event are sent before BIS 2 packets. During concurrent music broadcast and call unicast, the BIG events and CIG events are present alternately. The CIS 1 and CIS 2 represent the left and right channels of the primary headset. The CIS packets are sent in a CIG event followed by BIS packets in BIG event, followed by CIS packets in COG event and so on. After call or voice use case ends, the scenario (i.e., music broadcast) is restored.

Figure 21A:
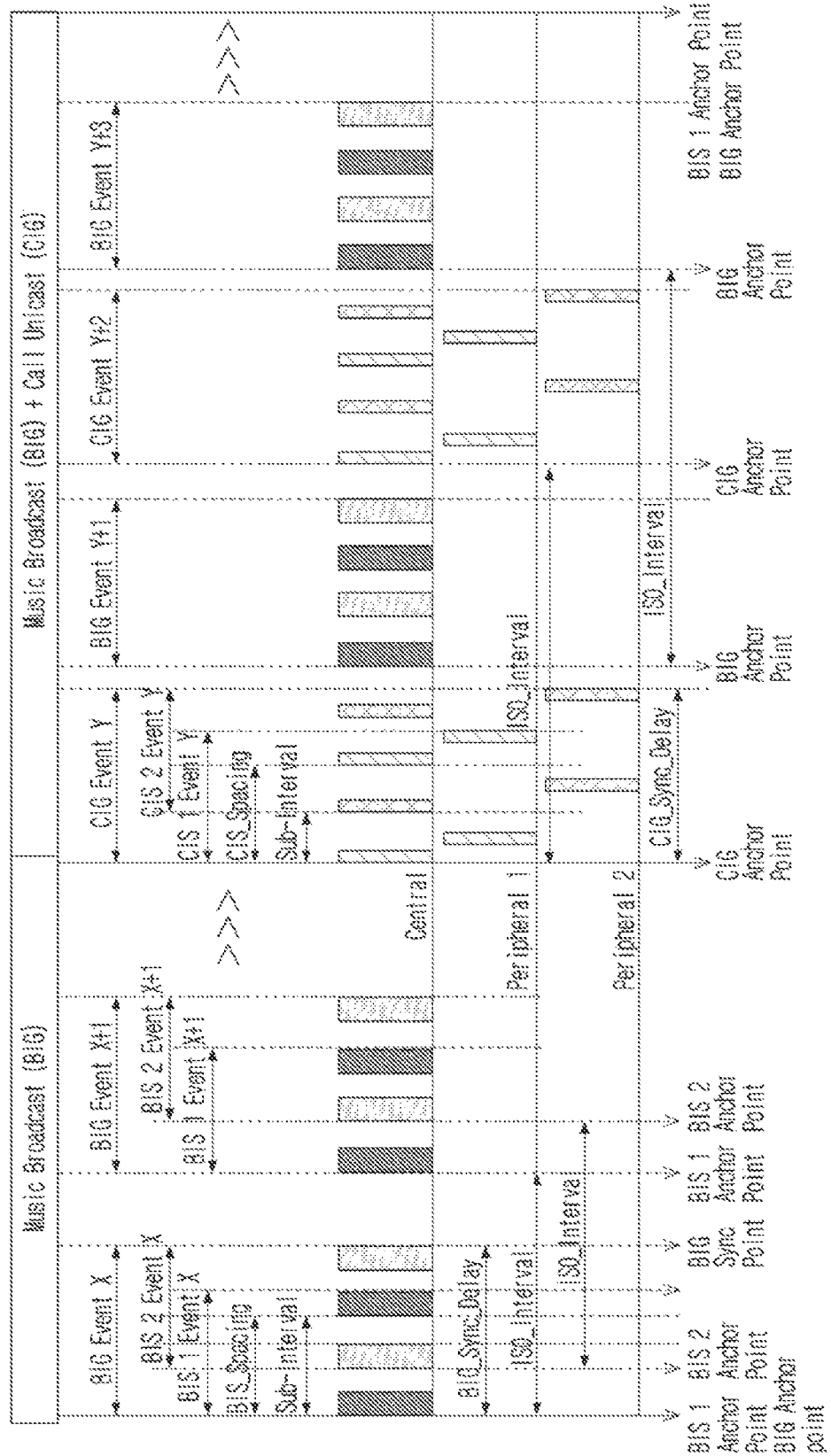
FIGS. 21A and 21B (FIG. 21B being a continuation of the right side of FIG. 20A) illustrates an example of CIG and BIG interleaved events and packet arrangement, according to an embodiment.
Figure 21B:
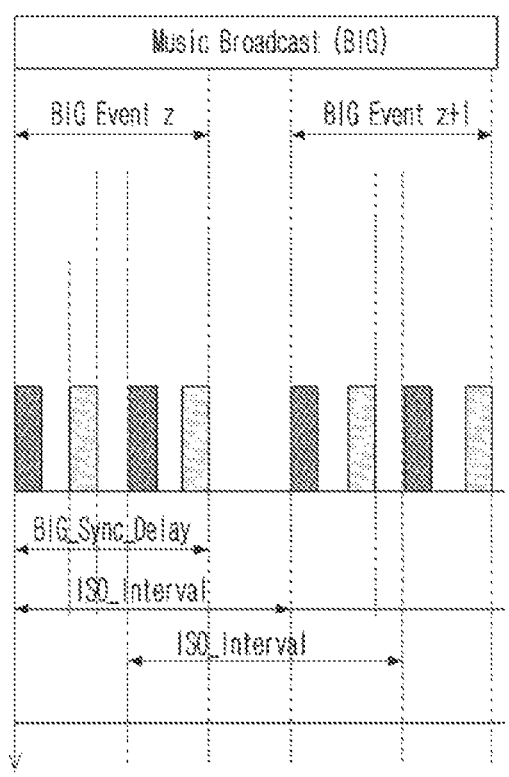

FIGS. 21A and 21B illustrate an example of CIG and BIG interleaved events and packet arrangement (S2100), according to an embodiment. FIG. 21B is a continuation of FIG. 21A and shows a portion to the right of FIG. 21A.

As shown in FIGS. 21A and 21B, during music broadcast, the packets are transferred in BIS sub-events and BIG events. BIS1 and BIS2 packets are interleaved (already known). During concurrent music broadcast and call unicast, the BIG events and CIG events are present alternately. The CIS 1 and CIS 2 represent the left and right channels of Primary Headset. The CIS packets are sent in a CIG event followed by BIS packets in BIG event, followed by CIS packets in COG event and so on. After call or voice use case end, the scenario (i.e., music broadcast) is restored.

The controller may set up the CIG send CIS packets in the channels that are available when there is no BIS packet to be sent over air.

The method according to various embodiments uses a channel selection technique to minimize the collision between the CIG and BIG packets.

One possible point of collision may occur when anchor points of CIG and BIG overlap, in that case the time offset is applied to the first subevent.

In order to avoid the collision, when setup of CIG, the controller takes into consideration if BIG is already active. If yes, the CIS parameters selected by controller are such that the CIG_Sync_Delay is extended to accommodate sufficient time for CIS packets to be sent over air with least possible collision.

FIG. 22A to FIG. 22C and FIGS. 23A to FIG. 23B show examples of a BT settings UI to enable feature and set the primary headset, according to an embodiment.

Figure 22A:
FIG. 22A to FIG. 22C and FIG. 23A to FIG. 23B show examples of a BT settings user interface (UI) to enable features and set a primary headset, according to an embodiment.
Figure 22B:
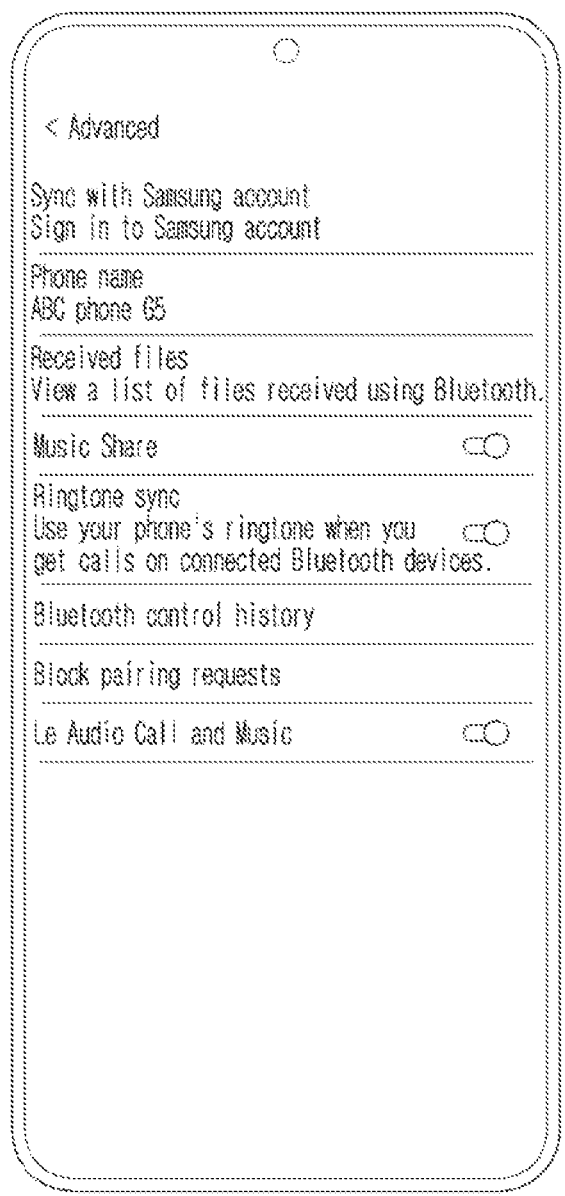
Figure 22C:

As shown in FIG. 22A to FIG. 22C, the user of the electronic device (100) may configure whether to allow for simultaneous broadcast and unicast feature from the BT Settings UI.

Figure 23A:
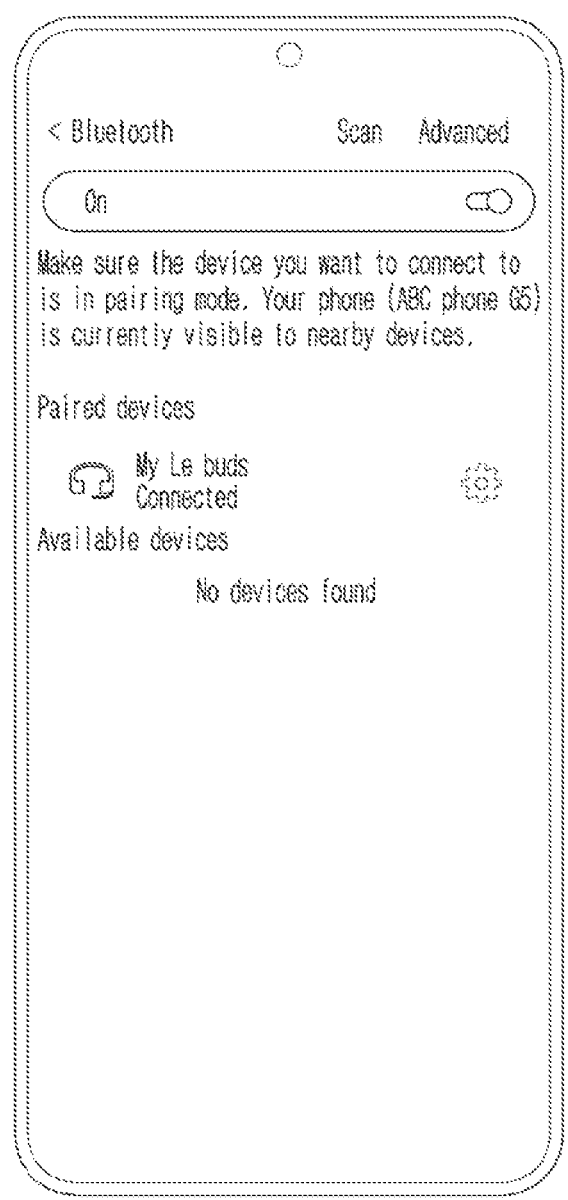
Figure 23B:
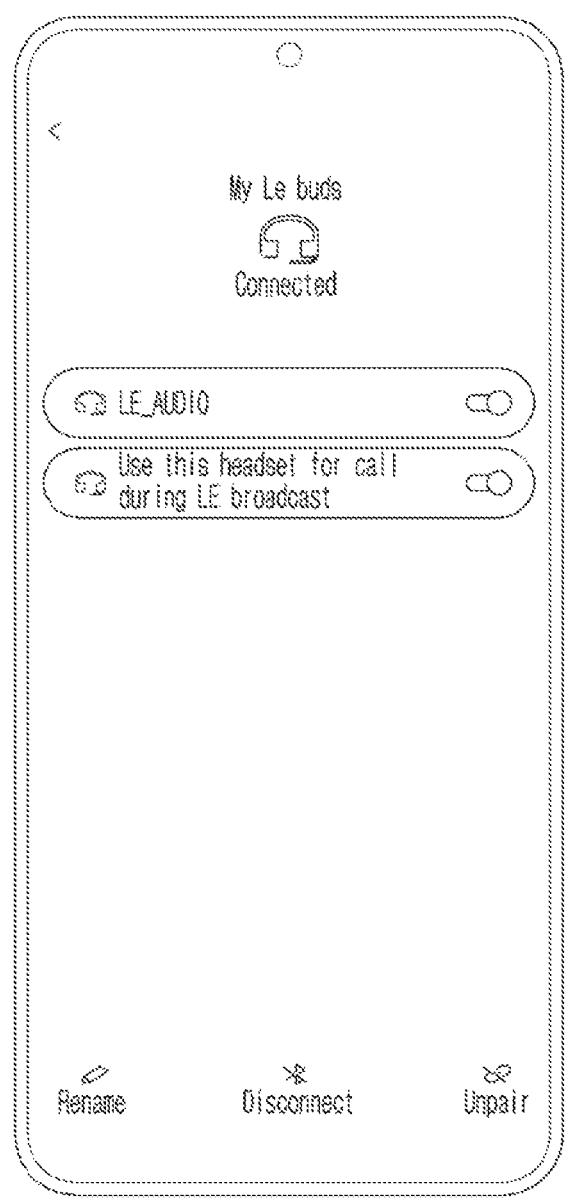

As shown in the FIG. 23A to FIG. 23B, the user of the electronic device (100) may choose to set any headset as a primary headset for voice data TX/RX during broadcast. If the simultaneous LE audio call and music feature is disabled by the user, then the preference is invisible. If the feature is enabled, only one BLE headset may be set as primary headset.

Figure 24A:
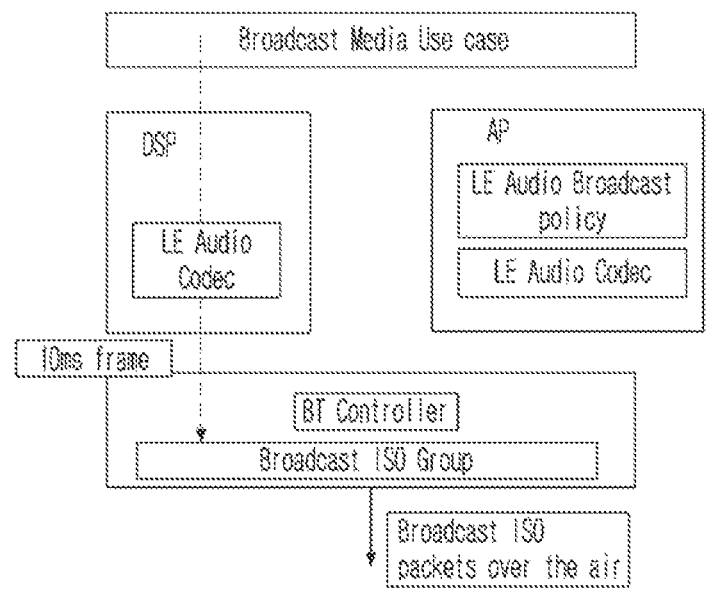
FIG. 24A illustrates an example of data flow from an application to a BT controller, according to the related art.

FIG. 24A illustrates an example of data flow from application to the BT controller (120), according to the related art. In the related art, the individual data paths for music and call data from application to the BT controller (120) are available.

Figure 24B:
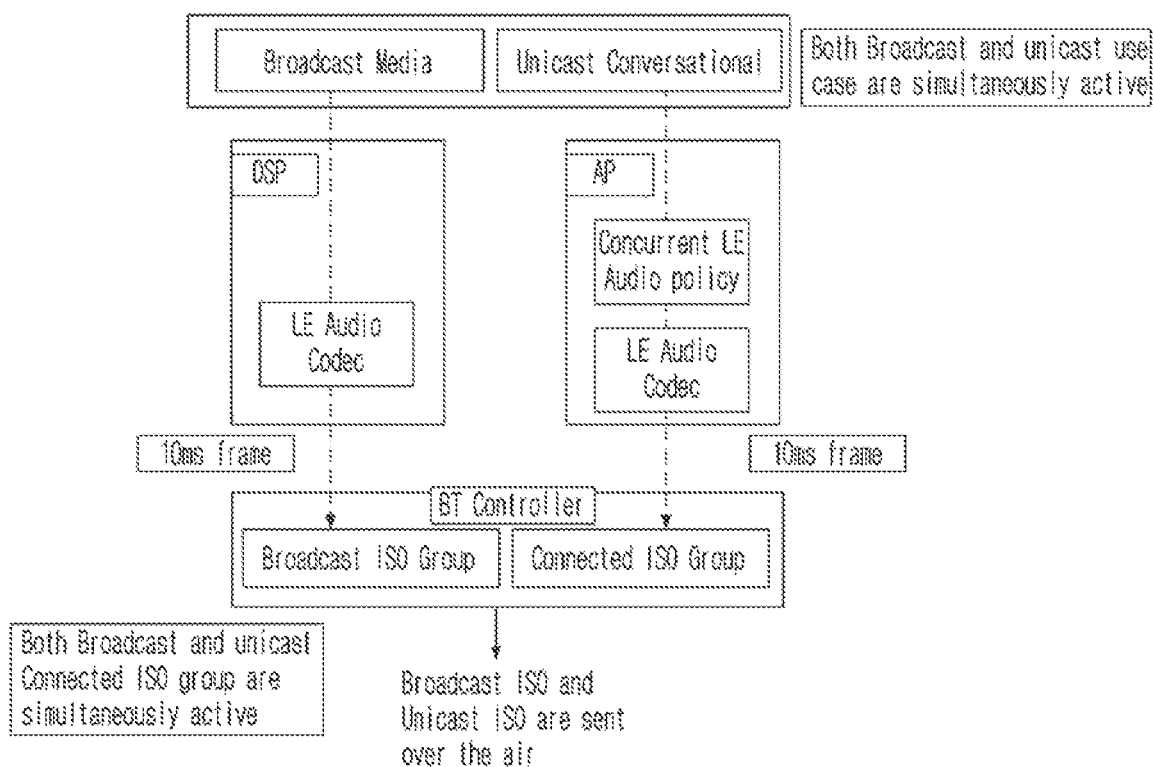
FIG. 24B illustrates an example of data flow from an application to a BT controller, according to an embodiment.

FIG. 24B illustrates an example of data flow from application to the BT controller (120), according to an embodiment. Simultaneous data paths for music and call data from the application to the BT controller (120) are available. The BT controller (120) is aware that the data received by the BT controller (120) from different interfaces are for different use cases. The interfaces will be mapped to CIG and BIG respectively.

With personal audio sharing, people will be able to share their Bluetooth audio experience with others around them for example sharing music from a smart phone with family and friends.

With location based audio sharing, public venues such as airports, bars, gyms, cinemas, and conference centers may now share Bluetooth audio that augments the visitor experiences.

The method according to various embodiments facilitates simultaneous LE audio broadcast sharing and a point to point LE audio unicast voice transfer between the smart phone and LE Audio devices without any interruption. Based on the method according to various embodiments, the user may stream broadcast audio from his/her phone even when using the phone for voice use cases such as call, voice recognition. Based on the method according to various embodiments, the call audio and broadcast media audio may be routed from audio layer to a BT layer, so that both may coexist without affecting each other.

The various actions, acts, blocks, steps, or the like in the flow charts (S1000 and S1400-S1600) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while various embodiments herein have been described, those skilled in the art will recognize that the embodiments herein may be practiced with modification within the scope of the embodiments as described herein and the appended claims.

What is claimed is:

1. A method comprising:
    establishing, by a first electronic device, a Broadcast Isochronous Group (BIG) with a plurality of second electronic devices;
    broadcasting, by the first electronic device, a first audio to the plurality of second electronic devices over the BIG;
    based on the first electronic device receiving a signal from an external device different from the plurality of second electronic devices, detecting, by the first electronic device, an audio event at the first electronic device while broadcasting the first audio to the plurality of second electronic devices;
    determining, by the first electronic device, at least one primary electronic device of the plurality of second electronic devices and at least one secondary electronic device of the plurality of second electronic devices; and
    continuing broadcasting, by the first electronic device, the first audio over the BIG to the at least one secondary electronic device and concurrently unicasting a second audio that is from the external device and that corresponds to the audio event over a Connected Isochronous Group (CIG) connection to the at least one primary electronic device.

2. The method as claimed in claim 1, wherein the audio event comprises at least one of receiving an incoming call at the first electronic device, initiating an outgoing call by the first electronic device, receiving an incoming notification at the first electronic device, receiving an alert generated at the first electronic device, initiating a voice recording application at the first electronic device, or initiating a voice assistant application at the first electronic device.

3. The method as claimed in claim 1, wherein the continuing broadcasting comprises:
    creating, by the first electronic device, a CIG interface between a Bluetooth controller and a Digital Signal Processor (DSP) controller;
    removing, by the first electronic device, the at least one primary electronic device from the BIG;
    establishing, by the first electronic device, the CIG connection with the at least one primary electronic device;
    configuring, by the first electronic device, a message comprising Connected Isochronous Stream (CIS) packets for the at least one primary electronic device and Broadcast Isochronous Stream (BIS) packets for the at least one secondary electronic device; and
    broadcasting, by the first electronic device, the BIS packets to the at least one secondary electronic device over the BIG through a BIG interface while concurrently unicasting the CIS packets to the at least one primary electronic device over the CIG connection through the CIG interface.

4. The method as claimed in claim 3, further comprising interleaving, by the first electronic device, the BIS packets and the CIS packets, and sending, by the first electronic device, the interleaved packets in a single Isochronous (ISO) interval for optimum bandwidth utilization at the first electronic device.

5. The method as claimed in claim 1, further comprising:
   detecting, by the first electronic device, that the audio event is on-going at the first electronic device; and
   managing, by the first electronic device, audio codec parameters and Quality of Service (QoS) configurations of the first audio when the second audio is on-going.

6. The method as claimed in claim 1, further comprising:
   detecting, by the first electronic device, that the audio event is stopped at the first electronic device; and
   broadcasting, by the first electronic device, the first audio to the plurality of second electronic devices over the BIG based on a result of the detecting.

7. The method as claimed in claim 1, wherein the first electronic device sends and receives the first audio and the second audio simultaneously over the BIG and the CIG connection, respectively, by at least one of:
   broadcasting the first audio from a DSP controller to a Bluetooth controller and sharing the second audio between the Bluetooth controller and at least one of a Bluetooth host, a processor and the DSP controller; or
   broadcasting the first audio from the Bluetooth host to the Bluetooth controller and sharing the second audio between the Bluetooth controller and at least one of the processor and the DSP controller.

8. The method as claimed in claim 1, wherein the first electronic device uses a low and medium quality of service (QoS) configuration for codec parameters for bandwidth optimization at the first electronic device.

9. A first electronic device comprising:
   a memory;
   a processor; and
   a Bluetooth audio multi-streaming controller, that is coupled to the memory and the processor, and that is configured to:
   establish a Broadcast Isochronous Group (BIG) with a plurality of second electronic devices;
   broadcast a first audio to the plurality of second electronic devices over the BIG;
   based on the first electronic device receiving a signal from an external device different from the plurality of second electronic devices, detect an audio event at the first electronic device while broadcasting the first audio to the plurality of second electronic devices;
   determine at least one primary electronic device of the plurality of second electronic devices and at least one secondary electronic device of the plurality of second electronic devices; and
   continue broadcasting the first audio over the BIG to the at least one secondary electronic device and concurrently unicast a second audio that is from the external device and that corresponds to the audio event over a Connected Isochronous Group (CIG) connection to the at least one primary electronic device.

10. The first electronic device as claimed in claim 9, wherein the audio event comprises at least one of receiving an incoming call at the first electronic device, initiating an outgoing call by the first electronic device, receiving an incoming notification at the first electronic device, receiving an alert generated at the first electronic device, initiating a voice recording application at the first electronic device, or initiating a voice assistant application at the first electronic device.

11. The first electronic device as claimed in claim 9, wherein to continue broadcasting the first audio over the BIG and to concurrently unicast the second audio the Bluetooth audio multi-streaming controller is further configured to:
   create a CIG interface between a Bluetooth controller and a Digital Signal Processor (DSP) controller;
   remove the at least one primary electronic device from the BIG;
   establish the CIG connection with the at least one primary electronic device;
   configure a message comprising CIS packets for the at least one primary electronic device and BIS packets for the at least one secondary electronic device; and
   broadcast the BIS packets to the at least one secondary electronic device over the BIG through a BIG interface while concurrently unicasting the CIS packets to the at least one primary electronic device over the CIG connection through the CIG interface.

12. The first electronic device as claimed in claim 11, wherein the Bluetooth audio multi-streaming controller is configured to interleave the BIS packets and the CIS packets and send the interleaved packets in a single Isochronous (ISO) interval for optimum bandwidth utilization.

13. The first electronic device as claimed in claim 9, wherein the Bluetooth audio multi-streaming controller is configured to:
   detect that the audio event is on-going at the first electronic device; and
   manage audio codec parameters and Quality of Service (QoS) configurations of the first audio when the second audio is on-going.

14. The first electronic device as claimed in claim 9, wherein the Bluetooth audio multi-streaming controller is configured to:
   detect that the audio event is stopped at the first electronic device; and
   broadcast the first audio to the plurality of second electronic devices over the BIG based on the detection.

15. The first electronic device as claimed in claim 9, wherein the Bluetooth audio multi-streaming controller is configured to send and receive the first audio and the second audio simultaneously over the BIG and the CIG connection by at least one of:
   broadcasting the first audio from a DSP controller to a Bluetooth controller and sharing the second audio between the Bluetooth controller and at least one of a Bluetooth host, the processor and the DSP controller; or
   broadcasting the first audio from the Bluetooth host to the Bluetooth controller and sharing the second audio between the Bluetooth controller and at least one of the processor and the DSP controller.

16. The first electronic device as claimed in claim 9, wherein the first electronic device uses a low and medium quality of service (QoS) configuration for codec parameters for bandwidth optimization at the first electronic device.

17. The method as claimed in claim 1, wherein the plurality of second electronic devices are hearables.

18. The first electronic device as claimed in claim 9, wherein the plurality of second electronic devices are hearables.

19. A method comprising:
   broadcasting, by a first electronic device, low energy (LE) audio to a plurality of second electronic devices, the first electronic device and the plurality of second electronic devices being included in a Broadcast Isochronous Group (BIG);

based on the first electronic device receiving a signal from an external device different from the plurality of second electronic devices, detecting, by the first electronic device, an audio event at the first electronic device during the broadcasting; and unicasting, by the first electronic device, audio that is from the external device and that corresponds to the audio event to at least one of the plurality of second electronic devices while continuing the broadcasting of the LE audio to a remainder of the plurality of second electronic devices.

20. The method as claimed in claim 19, wherein the plurality of second electronic devices are hearables, and
the at least one of the plurality of second electronic devices is included in a Connected Isochronous Group (CIG) connection with the first electronic device.

* * * * *